(12) United States Patent
Sano et al.

(10) Patent No.: US 6,655,728 B2
(45) Date of Patent: Dec. 2, 2003

(54) BODY STRUCTURE OF VEHICLE

(75) Inventors: Maki Sano, Kanagawa-ken (JP); Manabu Satou, Kanagawa-ken (JP); Hidetsugu Saeki, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 68 days.

(21) Appl. No.: 09/819,597

(22) Filed: Mar. 29, 2001

(65) Prior Publication Data

US 2001/0033094 A1 Oct. 25, 2001

(30) Foreign Application Priority Data

Apr. 25, 2000 (JP) ................................. P2000-124175
Apr. 25, 2000 (JP) ................................. 2000-124184

(51) Int. Cl.⁷ .............................................. B62D 15/08
(52) U.S. Cl. ................... 296/189; 296/203.02; 296/205
(58) Field of Search .......................... 296/188, 189, 296/194, 203.02, 205

(56) References Cited

U.S. PATENT DOCUMENTS

| 4,702,515 A | 10/1987 | Kato et al. | |
| 5,118,160 A | 6/1992 | Kitagawa et al. | |
| 5,466,033 A | 11/1995 | Murakami et al. | |
| 5,868,457 A | 2/1999 | Kitagawa | |
| 6,328,377 B1 * | 12/2001 | Makita et al. | 296/205 |
| 6,406,088 B1 * | 6/2002 | Tate | 296/189 |

FOREIGN PATENT DOCUMENTS

| EP | 2 085 371 | 4/1982 |
| JP | 60-122279 | 8/1985 |
| JP | 4-67577 | 6/1992 |
| JP | 4-310477 | 11/1992 |
| JP | 7-149261 | 6/1995 |
| JP | 8-26133 | 1/1996 |
| JP | 9-99858 | 4/1997 |
| JP | 10-244955 | 9/1998 |
| JP | 10-287269 | 10/1998 |
| JP | 11-208508 | 8/1999 |

* cited by examiner

*Primary Examiner*—Joseph D. Pape
(74) *Attorney, Agent, or Firm*—McDermott, Will & Emery

(57) ABSTRACT

A body structure of a vehicle having a cabin C and a compartment F.C, R.C is provided. The body structure includes a pair of laterally spaced side frame members 13,14 extending forwardly of the cabin at sides of the compartment. The side frame members 13,14 include widthwise rigidity lowering sections 21,52, respectively, to allow inward bending of a rear section 13R, 14R of each side frame member in a widthwise direction to provide an increased collapsible stroke for thereby effectively absorbing an energy in a wide range typically in a frontal impact.

27 Claims, 19 Drawing Sheets

FIG.4

| LONGITUDINAL FRAME MEMBER | | FUNCTIONS IN CONJUNCTION WITH FRONTAL IMPACT | DIFFERENCE IN WIDTHWISE RIGIDITY (Sx) INSIDE : OUTSIDE | BALANCE IN LONGITUDINAL RIGIDITY (Sy) | |
|---|---|---|---|---|---|
| F | Fa | ABSORB ENERGY BY COLLAPSING AND DEFORMING | INSIDE = OUTSIDE | Sy1 | LOW RIGIDITY |
|  | Fb | ABSORB ENERGY BY COLLAPSING AND DEFORMING (FACILITATE COLLAPSING AND DEFORMING) | INSIDE = OUTSIDE | Sy2 > Sy1 | |
| M | | SUPPORT FOR LONGITUDINAL COLLAPSING FORCE TRANSMITTED BY FRONT HALF Fa AND REAR HALF Fb | INSIDE ≧ OUTSIDE | Sy3 > Sy2 | HIGHEST RIGIDITY |
| R | Ra | ENSURE COUPLING RIGIDITY BETWEEN REAR MEMBER AND CABIN FRAME FACILITATE INWARD BENDING OF REAR MEMBER IN WIDTHWISE DIRECTION | INSIDE < OUTSIDE | Sy4 < Sy3 | |
|  | Rb | ENSURE COUPLING RIGIDITY BETWEEN REAR MEMBER AND CABIN FRAME FACILITATE INWARD BENDING OF REAR MEMBER IN WIDTHWISE DIRECTION | INSIDE < OUTSIDE | Sy5 ≧ Sy4 | HIGH RIGIDITY |

FIG.8
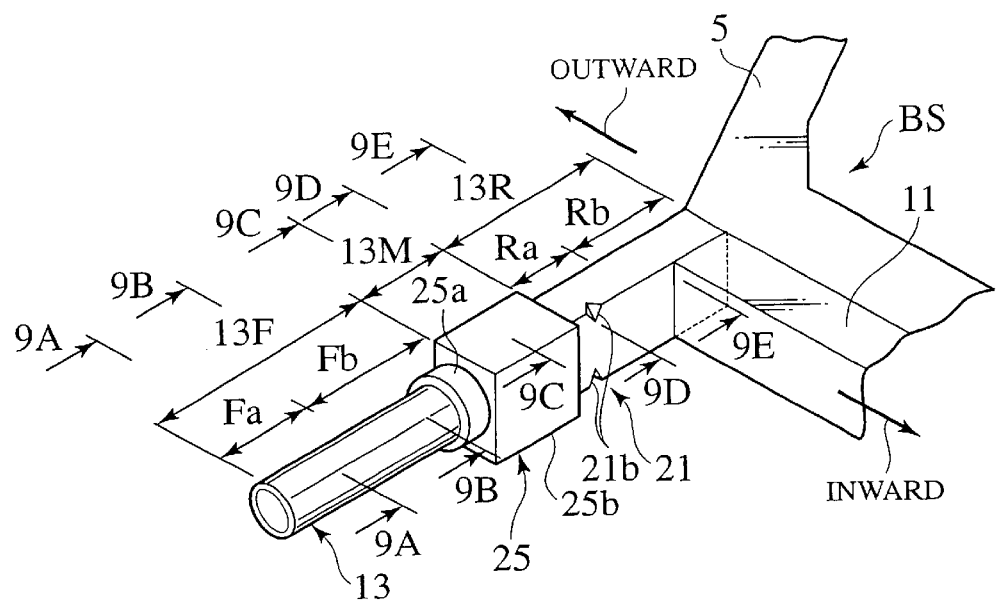
FIG.9A  FIG.9B
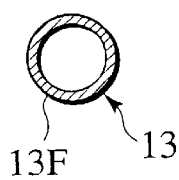 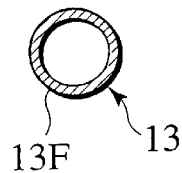
FIG.9C  FIG.9D  FIG.9E
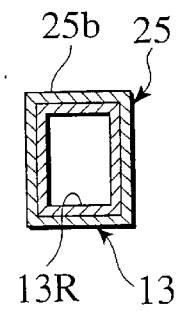 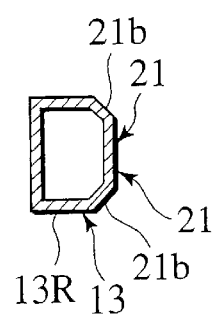 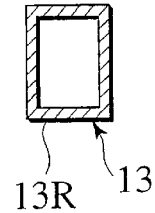

F<F'
M<M'

BODY STRUCTURE OF VEHICLE

BACKGROUND OF THE INVENTION

The present invention relates to a body structure of a vehicle and, more particularly, to a body structure of a motor vehicle.

In recent years, various research and development have been attempted to provide a body structure of a motor vehicle in consideration of a vehicle crash or the like.

Japanese Patent application Laid-Open Publication No. H9-99858 discloses a body structure that includes longitudinally extending frame members provided in a front compartment, which is located in front of a cabin for a passenger, taking a frontal impact of a vehicle into consideration. In such a body structure, the frame members are subjected to a impact load in a frontal impact and transmit the impact load to front pillars that are vertical frame members of the cabin for the passenger.

Japanese Patent Application Laid-Open Publication No. H11-208508 discloses a body structure that includes front side frame members, each rear parts of which has an extruded member, a die-cast member and a press-formed member connected between the extruded member and the die-cast member. Such a body structure is advantageous in that the press-formed member improves low toughness of the die-cast member for thereby increasing an impact absorbing capacity in welded junctions of the extruded member and the die-cast member.

SUMMARY OF THE INVENTION

However in view of further studies by the present inventors as to the above structures, a more smooth, continuous and progressive impact energy absorbing characteristic in a vehicle crash is required.

It is therefore an object of the present invention to provide a body structure of a vehicle effectively having a smooth, continuous and progressive impact absorbing characteristic to be more effective in absorbing impact energy that is applied to the body structure in a vehicle crash or the like.

In the present invention in order to attain the above object, a body structure of a vehicle is provided with: a cabin; a compartment in close proximity to the cabin; first frame members provided in the compartment, laterally spaced to each other in a widthwise direction of the body structure, and longitudinally extending in a longitudinal direction of the body structure from the cabin; and a widthwise rigidity adjustment section provided in at least one of the first frame members and having a non-symmetric strength distribution in the widthwise direction.

In other words, a body structure of a vehicle relating to the present invention is provided with: a cabin; a compartment in close proximity to the cabin; frame members provided in the compartment, laterally spaced to each other in a widthwise direction of the body structure, and longitudinally extending in a longitudinal direction of the body structure from the cabin; and means for adjusting a widthwise rigidity in at least one of the frame members by a non-symmetric strength distribution thereof in the widthwise direction.

In another aspect of the present invention, a body structure of a vehicle having a cabin and a compartment in the close proximity to the cabin, wherein at least one of the side frame members, which are laterally spaced and longitudinally extending in the compartment, has a region including an outer portion and an inner portion with a rigidity lower than that of the outer portion in a widthwise direction of the body structure.

Other aspect and advantages of the present invention will become more apparent from the following description, taken in conjunction with the accompanying drawings, illustrating by way of example the principles of the present invention.

BRIEF DESCRIPTION OF THE DRAWINGS

FIG. 4 is a table illustrating the relationship between various sections of a side frame member and varying rigidities in a longitudinal direction of the body structure;

FIG. 8 is an enlarged, partial perspective view of a second preferred embodiment of a body structure according to the present invention;

FIGS. 9A to 9E are cross sectional views taken along lines 9A—9A, 9B—9B, 9C—9C, 9D—9D and 9E—9E shown in FIG. 8, respectively;

FIGS. 21A to 21C are plan views of a front side frame member of the body structure shown in FIG. 14, wherein FIG. 21A shows a situation that the front side frame member is in its original state before frontal impact, FIG. 21B shows a situation when the front side frame member is subjected to the frontal impact and FIG. 21C shows a situation when the front side frame member is in the latter stage of the frontal impact;

DETAILED DESCRIPTION OF THE PREFERRED EMBODIMENTS

A description will be in detail given below of a body structure of a vehicle in accordance with each of embodiments of the present invention preferably with reference to FIGS. 1 to 26. The body structure of the present invention is representatively applied to a motor vehicle as a matter of convenience for description.

First, referring to FIGS. 1 to 7, there is shown a first preferred embodiment of a body structure applied to a motor vehicle according to the present invention.

Figure 1:
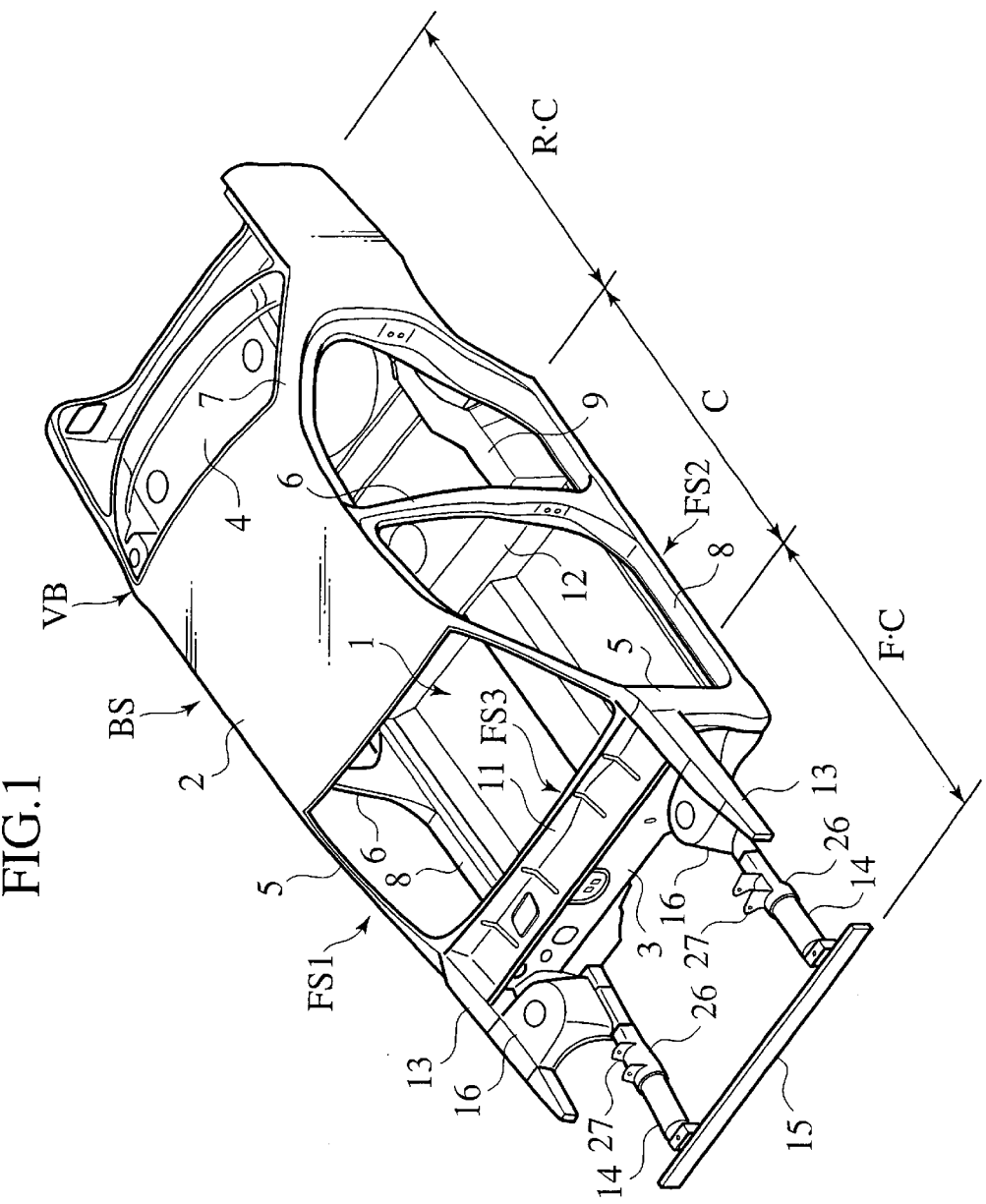
FIG. 1 is a perspective view of a first preferred embodiment of a body structure according to the present invention, with the body structure being shown as applied to a motor vehicle.

As shown in FIG. 1, a body structure BS of a vehicle body VB includes a horizontally extending floor member 1, a horizontally extending roof panel 2, dash cross member 3 vertically extending upward from the floor panel 1, and a rear parcel 4, to form a front compartment F.C, a cabin C for a passenger and a rear compartment R.C.

The cabin C is substantially defined by an upwardly extending frame structure FS1, a longitudinally extending frame structure FS2 and a transverse or widthwise frame structure FS3.

More specifically, the upwardly extending frame structure FS1 is substantially structured by a pair of laterally spaced, vertically extending front pillars 5 connected to a hood ridge side frame members 13, a transverse cowl box 11 and the roof panel 2, a pair of laterally spaced, vertically extending center pillars 6 connected to side sills 8 and the roof panel 2, and also a pair of laterally spaced, obliquely extending rear pillars 7 connected to the roof panel 2 or the like.

The longitudinally extending frame structure FS2 is substantially structured by the pair of laterally spaced, longitudinally extending side sills 8 and a pair of laterally spaced rear side members 9.

The transverse or widthwise frame structure FS3 is substantially structured by the dash cross member 3, the transverse cowl box 11 extending in a widthwise direction of the vehicle body and connected to an upper end of the dash cross member 3 and a rear seat cross member 12 extending in the widthwise direction between rear side members 9, with distal ends of the cowl box 11 being connected to the font pillars 5 and the hood ridge side frame members 13, respectively.

Thus, the frame structures FS1, FS2 and FS3 provide desired rigidity and strength characteristics to the cabin C.

In the front compartment F.C, the pair of laterally spaced hood ridge side frame members 13 and a pair of laterally spaced front side frame members 14 are respectively provided to longitudinally extend at upper sides and lower sides thereof.

More specifically, the front compartment F.C includes the hood ridge frame members 13 which are gently sloping downward in a forward direction from respective lower ends of the front pillars 5, and the pair of laterally spaced, longitudinally and horizontally extending front side frame members 14 located in a position beneath the hood ridge side frame members 13 at lower sides of the front compartment F.C and connected to the dash cross members 3. Each of the hood ridge side frame members 13 has a hollow, rectangular, closed cross-sectional structure made of extruded light metal such as an aluminum alloy or magnesium alloy and serving as an energy absorbing member. Each of the front side frame members 14 has a hollow, closed cross-sectional structure made of extruded light metal such as an aluminum alloy or magnesium alloy and serving as an energy absorbing member, too.

The hood ridge side frame members 13 have rear distal ends connected to lower ends of the front pillars 5, respectively, and front distal ends connected to radiator core supports (not shown).

The front side frame members 14 have rear ends curved toward lower end walls of the dash cross member 3 and connected thereto, and front portions interconnected with the radiator core supports (not shown) in the substantially same position as the hood ridge side frame members 13, with front distal ends of the respective front portions being interconnected with one another through a bumper armature 15 and a first cross member (not shown) at a position forwardly of the radiator core support connected to the hood ridge side frame members 13.

Also, an intermediate portion of each hood ridge side frame member 13 and a rear section of each front side frame member 14 are interconnected with one another through a strut housing 16 serving as an interconnecting member that forms a main reinforcement frame member in the front compartment F.C.

As clearly seen in FIG. 2 and FIGS. 3A to 3E, each of the hood ridge frame members 13 includes a front section 13F, an intermediate section 13M and a rear section 13R, with the intermediate or central section 13M being connected to the strut housing 16.

More specifically, each of the hood ridge side frame members 13 has a longitudinal rigidity Sy that varies in rigidity along a longitudinal direction of the body structure BS. That is, the longitudinal rigidity pattern includes a low rigidity zone, the highest rigidity zone and a high rigidity zone, which are sequentially formed in the front section 13F, the intermediate section 13M and the rear section 13R, respectively, so as to progressively absorb energy in the frontal impact for thereby effectively preventing the cabin C from receiving the heavy impact load.

More specifically, the front section 13F has a rigidity lower than that of the rear section 13R, which is lower in rigidity than the intermediate section 13M such that the low rigidity, the highest rigidity and the high rigidity are given to the front section 13F, the intermediate section 13M and the rear section 13R, respectively. To this end, the intermediate section 13M is joined to the strut housing 16 and additionally incorporates therein a plurality of longitudinally spaced braces 22 in close proximity to distal ends of the strut housing 16 such that the intermediate section 13M has the highest rigidity.

Figure 2:
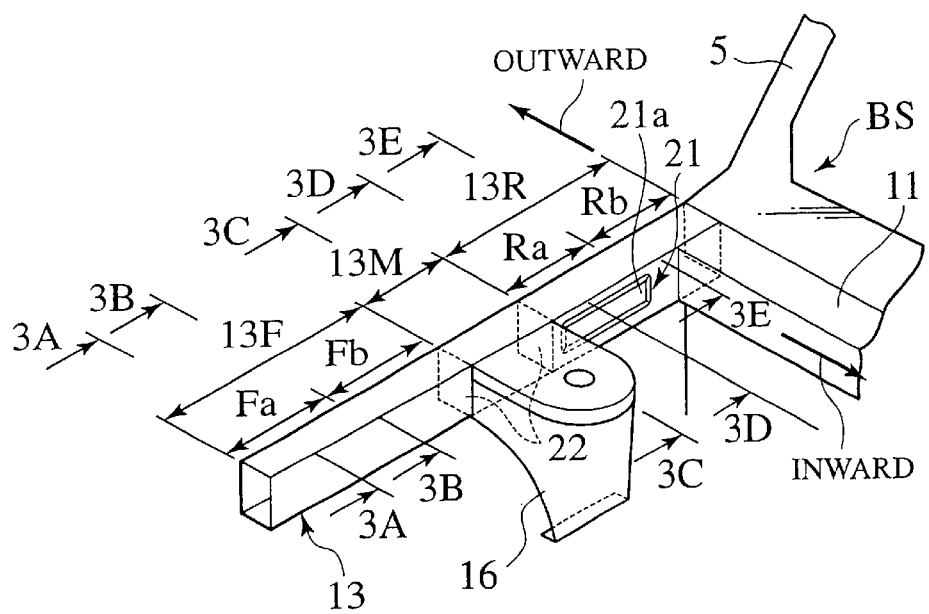
FIG. 2 is an enlarged, partial perspective view of the body structure shown in FIG. 1.
Figure 3A:
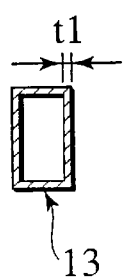
FIGS. 3A to 3E are cross sectional views taken along lines 3A—3A, 3B—3B, 3C—3C, 3D—3D and 3E—3E shown in FIG. 2, respectively.
Figure 3B:
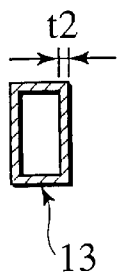
Figure 3C:
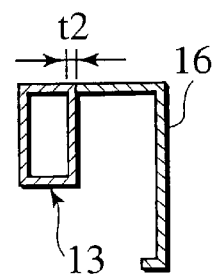
Figure 3D:
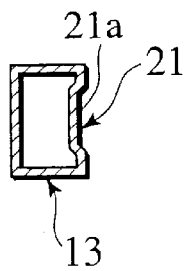
Figure 3E:
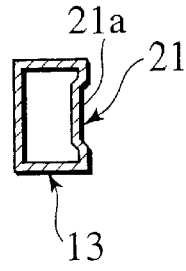
Figure 5:
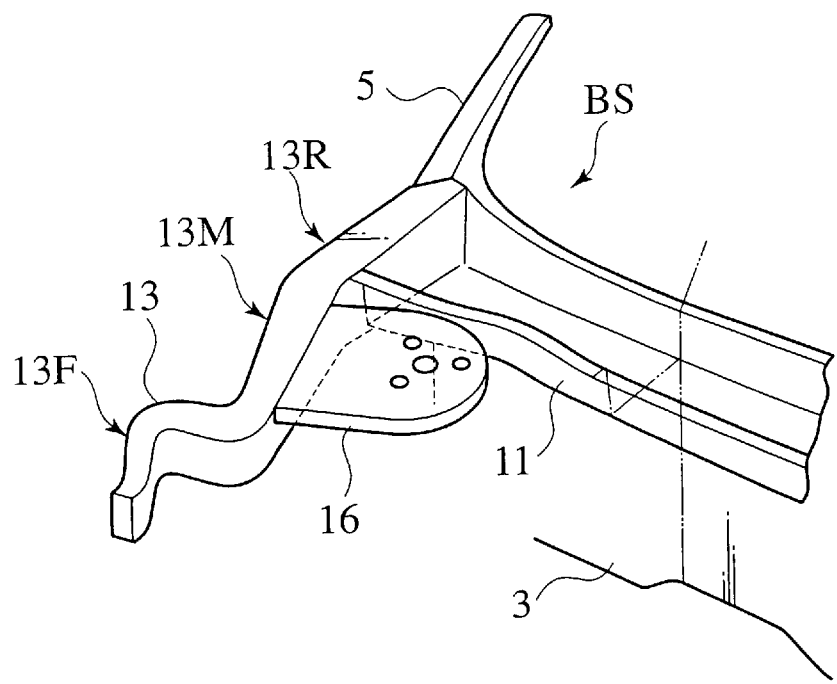
FIG. 5 is a perspective view of the body structure of the first preferred embodiment for illustrating one deforming pattern of the body structure.

As best shown in FIG. 2 and FIGS. 3D and 3E, an inside wall of the rear section 13R includes a widthwise rigidity adjustment section formed by a weakened or collapsible deforming portion 21 formed with an inwardly indent bead 21a and serving as a rigidity lowering section (rigidity lowering means).

The bead 3 is formed in an inner side wall of a hollow, closed cross-sectional structure of the rear section 13R and inwardly indent from the inner side wall for providing a widthwise rigidity pattern Sx that provides a lower rigidity in the inner side wall than that of an outer side wall in the widthwise direction.

When forming the hood ridge side frame members 13 with the profile as viewed in FIGS. 3A to 3E, an extruded product of light metal such as aluminum alloy or magnesium alloy formed in a hollow, closed cross-sectional profile is effectively utilized. In addition, the hollow, box-shaped, cross-sectional structure of the hood ridge side frame member 13 may have different cross sections varying in the longitudinal direction or different wall thickness varying in the widthwise direction to easily provide the aforementioned different rigidities in the longitudinal direction of the body structure BS or the like.

In the first preferred embodiment shown in FIG. 2, the front section 13F has a front, substantially half segment Fa having a thickness t1, and a rear, substantially half segment Fb having a thickness t2 larger than the thickness t1 as viewed in FIGS. 3A and 3B, such that the front half segment Fa has the smallest rigidity Sy1, the rear half segment Fb has the substantially same thickness t2 as that of the intermediate section 13M as viewed in FIG. 3C to provide a rigidity Sy2 larger than the rigidity Sy1 of the front half segment Fa but smaller than a rigidity Sy3 of the intermediate section 13M joined with the strut housing 16 as viewed in FIG. 3C.

Also, the rear section 13R may have a thickness substantially equal to the thickness t2 of the intermediate section 13M or slightly smaller than that of the intermediate section 13M, with the cross-sectional structure having upper and lower walls having an increased width, and outer and inner walls having an increased vertical height as viewed in FIGS. 3D and 3E for thereby providing a rigidity lower than that of the intermediate section 13M.

More specifically, the rear section 13R has a front, substantially half segment Ra and a rear, substantially half segment Rb, with the front half segment Ra having a rigidity Sy4 lower than that Sy3 of the intermediate section 13M while the rear half segment Rb has a rigidity Sy5 either substantially equal to the rigidity Sy4 of the front half segment Ra or slightly larger than that of the front half segment Ra.

Namely, by providing both the longitudinal rigidity pattern Sy and the transverse or widthwise rigidity pattern Sx to the body structure BS, the hood ridge side frame members 13 operates such that the front section 13F is caused first to collapse and deform in the longitudinal direction in a frontal impact to absorb impact energy, with the intermediate section 13M providing a supporting reactive force to enable the front section F to collapse. When this happens, the body structure BS has the aforementioned physical characteristics in that the rear sections 13R provide an increased joint rigidities in conjunction with the cabin C while facilitating the hood ridge side frame members 13 to bend and deform inwardly in the transverse or widthwise direction of the body structure.

FIG. 4 shows the functional relationship between the front, intermediate and rear sections 13F, 13M and 13R of each hood ridge frame member 13 and various rigidities associated therewith, respectively.

In the first preferred embodiment, the intermediate section 13M is made of extruded light metal and basically has the same closed, box-shaped, cross-sectional structure as the front section 13F. Since, however, the intermediate section 13M is at an inner side joined with the strut housing 16, the intermediate section 13M has the highest rigidity. In such a structure, even though an outer wall of the intermediate section 13M has a lower rigidity than that of the inner wall, the rigidity of the outer wall of the intermediate section 13M is larger than that of the inner wall of the rear section 13R of which inner wall is formed with the bead 21a, the intermediate section 13M does not adversely affect the deforming operation of the rear section 13R in the widthwise direction.

In the operation with such a structure in the first preferred embodiment, when the hood ridge side frame members 13 are subjected to a force with a component in the direction of the longitudinal axis of the body structure BS in a frontal impact, the hood ridge side frame members 13 are caused first to collapse and deform in the longitudinal direction. When the reacting force opposite to the collapsing force increases, each of the hood ridge frame members 13 is inwardly bent and deformed in the widthwise direction at the rear section 13R, thereby absorbing impact energy in an efficient manner.

More specifically, since each of the hood ridge side frame members 13 has three different rigidity characteristics in the front section 13F, the intermediate section 13M and the rear section 13R, respectively, that are sequentially located in the longitudinal direction of the body structure, namely, the low rigidity zone in the front section 13F, the highest rigidity zone in the intermediate section 13M and a high rigidity zone in the rear section 13R. Thus, each of the hood ridge side frame members 13 has a desired supporting rigidity pattern for absorbing the impact energy in a frontal impact. Also, since the collapsing force applied to the front section 13F in the longitudinal direction is dissipated by the intermediate section 13M having the highest rigidity zone to increase the reacting force in an early stage of the frontal impact, thereby enabling the front section 13F to deform from the front distal end in a smooth, continuous and progressive sequence.

When the collapsing force further increases in the frontal impact, since the front distal ends of the hood ridge side frame members 13 are restricted for widthwise, outward expanding movement due to the radiator core supports (not shown) while the rear section 13R has a reduced widthwise, inward rigidity characteristic, the rear section 13R of each hood ridge frame member 13 is inwardly bent to deform in the widthwise direction around the center formed by the rear section R. When this occurs, stress is concentrated to discontinuous rigidity boundaries formed in the front section 13F, the intermediate section 13M and the rear section 13R, allowing each of the hood ridge frame members 13 to bent and deform inwardly in the widthwise direction, as viewed in FIG. 5, to provide multi-stage folded segments for thereby effectively absorbing the impact energy in the frontal impact.

In such an inward bending and deforming action of the hood ridge side frame members 13 in the widthwise direction of the body structure BS, each hood ridge side frame member 13 has an increased deforming stroke in the longitudinal direction of the body structure, with a resultant increase in a longitudinal collapsible range in the front compartment F.C. Thus, the front compartment F.C is allowed to deform in a desired pattern to achieve an efficient impact absorbing characteristic with a resultant effective increase in the amount of impact energy to be absorbed by each hood ridge side frame member 13.

Since, further, each of the hood ridge side frame members 13 is allowed to deform inwardly in the widthwise direction without any irregular bending or deformation caused in undesired areas and each front section 13F is caused to collapse and deform in good order initially from the front half segment Fa, the front compartment F.C is allowed to deform in a desired, stable deforming mode at both the right and left side portions, improving the impact energy absorbing characteristic in the frontal impact.

In addition to the effectively improved energy absorbing characteristic discussed above, since the hood ridge side frame members 13 are allowed to deform inwardly in the widthwise direction of the body structure BS, the hood ridge side frame members 13 have an increased deforming stroke along the longitudinal direction of the body structure BS to allow each intermediate section 13M having the highest rigidity characteristic to be folded inwardly in the widthwise direction around the rear section 13R having the high rigidity characteristic. Thus, the intermediate section 13M and the rear section 13R can avoid formation of a prop portion of a rigid structure that would otherwise transmit an impact load to the cabin C, thereby decreasing a decelerating speed of the cabin.

Figure 6:
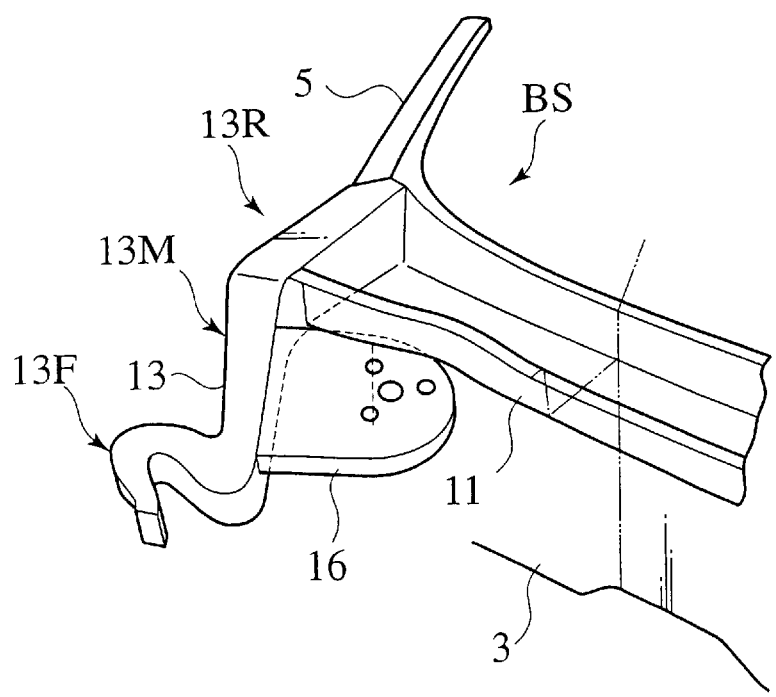
FIG. 6 is a perspective view of the body structure of the first preferred embodiment for illustrating another deforming pattern of the body structure.
Figure 7:
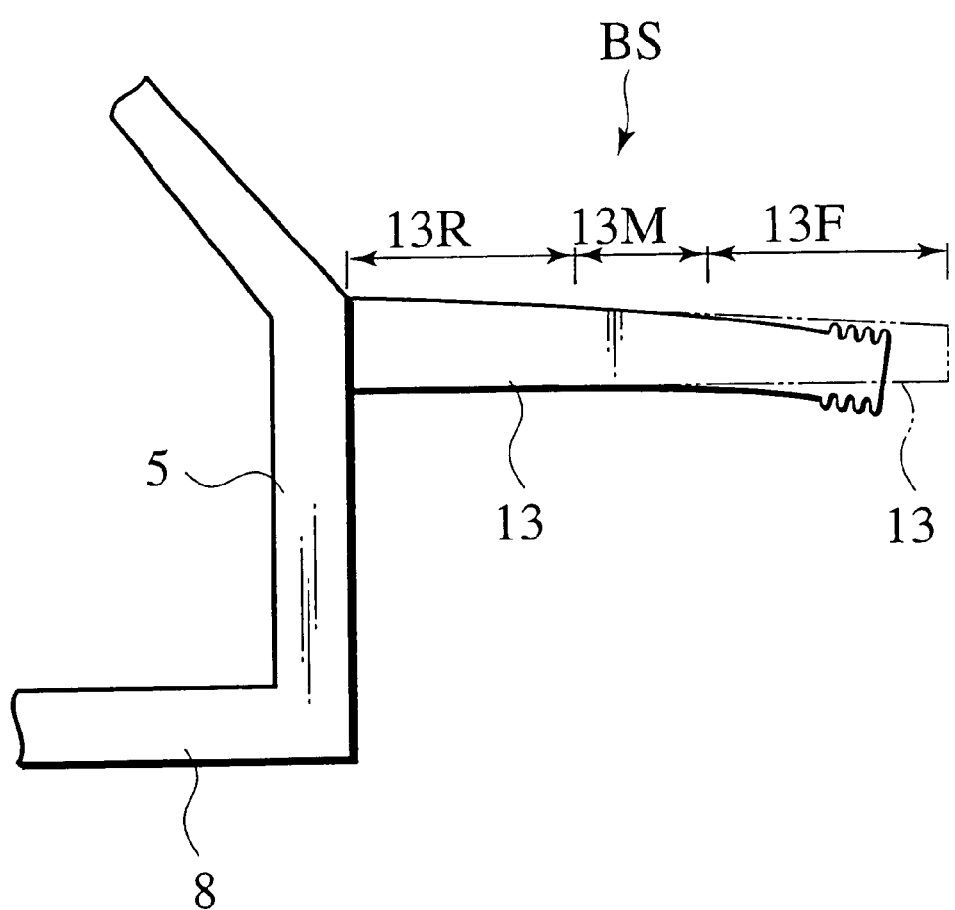
FIG. 7 is a perspective view of the body structure of the first preferred embodiment for illustrating a deforming pattern of a front section of the side frame member.

In particular, since the hood ridge side frame members 13 are gently sloped downward in the forward direction of the body structure BS, each of the hood ridge side frame members 13 is caused to bend downwardly at the front section F in the longitudinal direction of the body structure as viewed in FIG. 7.The sloping angle of the hood ridge side frame member 13 and the vertical position of the cowl box 11 may be designed such that an upper end of each strut housing 16 does not interfere with the cowl box 11 as viewed in FIG. 6 to allow the upper end of the strut housing 16 to enter the space beneath the lower end of the cowl box 11 during deforming operation of each hood ridge side frame member 13, thereby achieving a further decrease in the decelerating speed of the cabin.

Next, a second preferred embodiment of a body structure according to the present invention will be described with reference to FIG. 8 and FIGS. 9A to 9E, with like parts bearing the same reference numerals or symbols as those used in FIGS. 1 to 7.

In the second preferred embodiment, the hood ridge side frame member 13 includes separate frame components, that is, a front member 13F, a rear member 13R, both of which are formed of extruded light metal as in the first preferred embodiment, and an intermediate, joint member 25 as an intermediate member 13M interconnected between the front section 13F and the rear section 13R.

The front member 13F is made of an extruded metal of a hollow, cylindrical shape and the rear member 13R is made of an extruded light metal of a hollow, rectangular, closed cross-sectional structure. The joint member 25 includes a first cylindrical socket portion 25a and a hollow, rectangular second socket portion 25b. The first cylindrical socket portion 25a receives a rear end of the front member 13F, and the second rectangular socket portion 25b receives a front end of the rear member 13R as viewed in FIG. 9C, with joint portions being welded together.

With such an interconnection between the front member 13F and the rear member 13R through the joint member 25, the joint portion has a multi-layered structure as viewed in FIG. 9C such that the joint member 25 has the highest rigidity in the longitudinal rigidity pattern Sy. The front member 13F has a small, closed cross-sectional structure having the low rigidity in the longitudinal rigidity pattern Sy, and the rear member 13R has a rigidity lower than that of the joint member 25 in the longitudinal rigidity pattern Sy.

In the second preferred embodiment, the front and rear members 13F and 13R have front and rear half segments Fa and Fb and front and rear half segments Ra and Rb, respectively, with the front and rear half segments of each member and the joint member having the same longitudinal rigidity pattern Sy as that of the first preferred embodiment.

In the second preferred embodiment, also, the front half segment Ra of the rear member 13R includes a widthwise rigidity adjustment section composed of cutouts 21b formed at upper and lower, inner corners of the front half segment of the rear member 13R. Thus, an inner wall of the front half segment 13Ra of the rear member 13R has a lower rigidity than that of an outer wall of the front half segment 13Ra, promoting inward bending of the rear member 13R in the widthwise direction in the frontal impact.

With such a structure in the second preferred embodiment, consequently, the front member 13F of each hood ridge side frame member 13 is caused to progressively collapse and deform in good order in the longitudinal direction starting from the front half segment Fa and the front half segment Ra of the rear member 13R is caused to bend and deform inward in the widthwise direction in the same manner as discussed above with reference to the first preferred embodiment. Thus, the body structure of FIG. 8 has an increase in the collapsible area in the front compartment F.C. In this event, both the joint member 25 and the rear member 13R functions to prevent formation of a prop portion of a rigid structure that would otherwise transmit an impact load to the cabin C, thereby providing a decrease in a decelerating speed of the cabin.

Next, FIG. 10 and FIGS. 11A to 11E show a third preferred embodiment of a body structure according to the present invention, with like parts bearing the same reference numerals or symbols as those used in FIGS. 1 to 7.

As viewed in FIGS. 11A to 11E, the hood ridge side frame member 13 is made of extruded light metal having a hollow, rectangular, cross-sectional structure and has the front section 13F, the intermediate section 13M and the rear section 13R, which have progressively increased thickness and have progressively increased cross sectional area.

Figure 10:
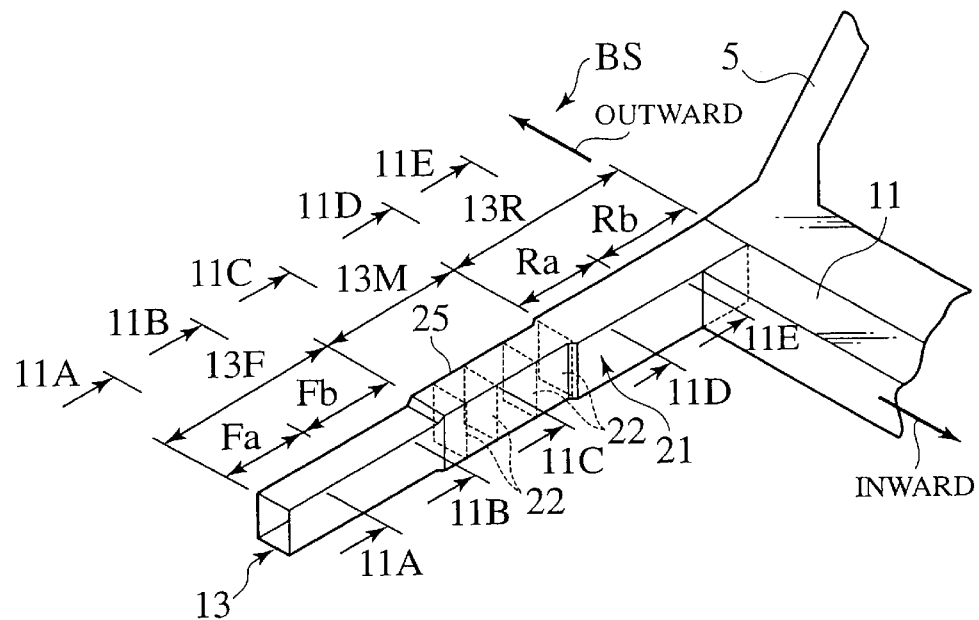
FIG. 10 is an enlarged, perspective view of a third preferred embodiment of a body structure according to the present invention.
Figure 11A:
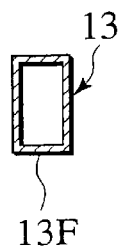
FIGS. 11A to 11E are cross sectional views taken along lines 11A—11A, 11B—11B, 11C—11C, 11D—11D and 11E—11E shown in FIG. 10, respectively.
Figure 11B:
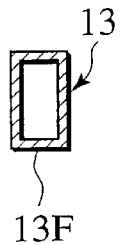
Figure 11C:
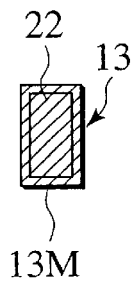

In the third preferred embodiment, further, the intermediate section 13M incorporates therein a plurality of braces 22 which are longitudinally spaced in the hollow, closed cross-sectional structure as viewed in FIGS. 10 and 11C to provide the highest rigidity in the longitudinal rigidity pattern Sy, with the front section 13F having the low rigidity and the rear section 13R having the high rigidity as in the first preferred embodiment.

With such a structure, also, the front section 13F and the rear section 13R have the front half segments Fa and the rear half segment Fb and the front half segment Ra and the rear half segment Rb, respectively, providing different rigidities in the series of areas Fa, Fb, 13M, Ra and Rb in the longitudinal rigidity pattern Sy as in the first preferred embodiment.

Figure 11D:
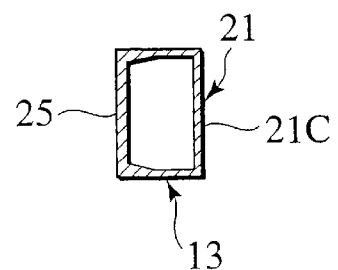
Figure 11E:
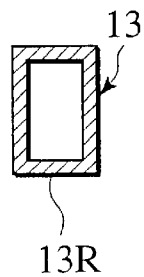

In the third preferred embodiment discussed above, further, the front half segment Ra of the rear section 13R includes a widthwise rigidity adjustment section, which is formed with an inner vertical thin wall 21c having a thickness equal to half of the thickness of an outer wall as viewed in FIG. 11d such that the front half segment Ra of the rear section R has a widthwise inner rigidity lower than a widthwise outer rigidity in the widthwise rigidity pattern Sx for the reasons as previously discussed.

Consequently, the third preferred embodiment has the similar advantages as obtained by the first preferred embodiment in that the front section 13F of each hood ridge side frame member 13 is caused to progressively collapse and deform in good order in the longitudinal direction from the front half segment Fa of the front section 13F while allowing the front half segment Ra of the rear section 13R to bend and deform inward in the widthwise direction, with a resultant increase in the collapsible area in the front compartment F.C. Thus, the intermediate section 13M and the rear section 13R can avoid formation of a prop portion of a rigid structure that would otherwise transmit an impact load to the cabin C, thereby providing a decrease in a decelerating speed of the cabin.

Figure 12:
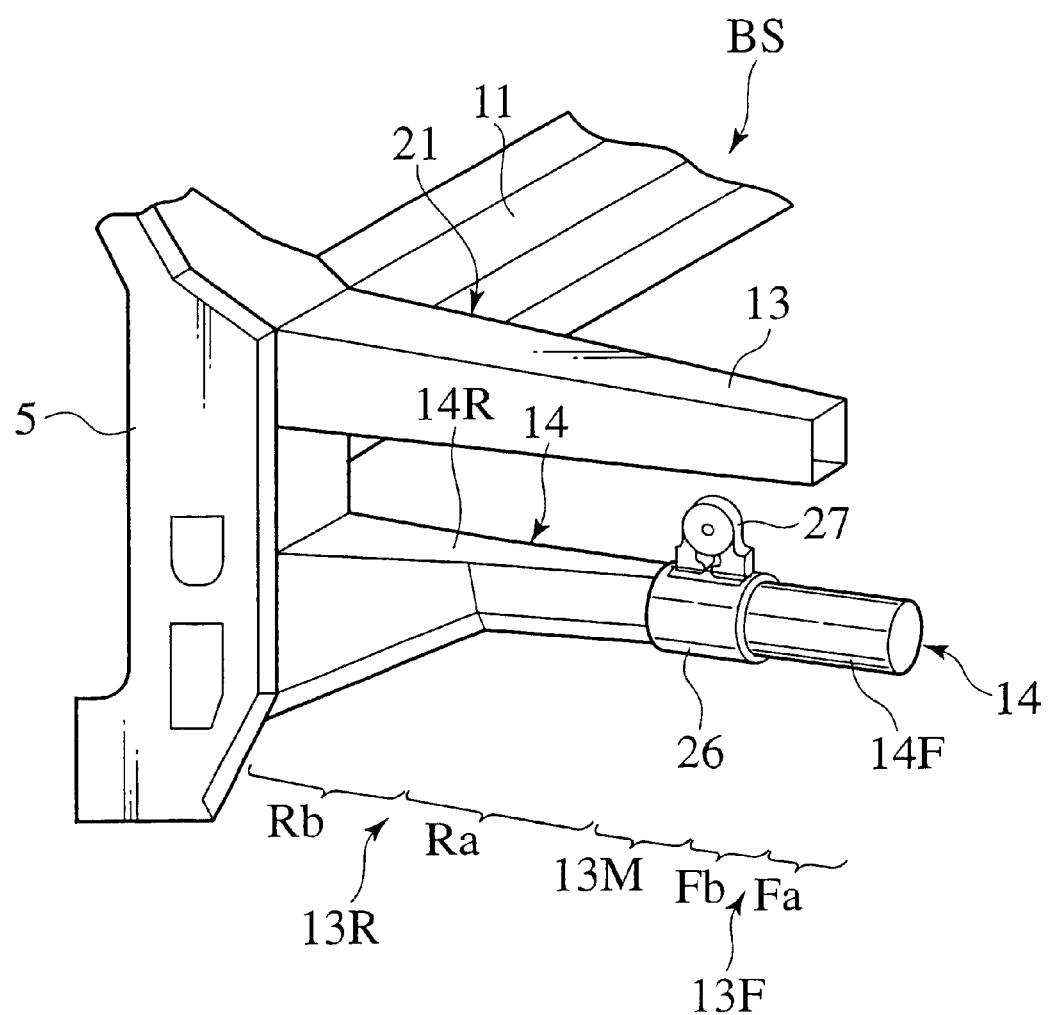
FIG. 12 is an enlarged, perspective view of a fourth preferred embodiment of a body structure according to the present invention.

Next, a fourth preferred embodiment of the body structure according to the present invention is shown in FIG. 12, wherein the principle concept of the present invention is shown as also applied to front side frame members 14.

In FIG. 12, a front side frame member 14 includes a front member 14F, a rear member 14R and an intermediate, joint member 26 interconnected between the front member 14F and the rear member 14R, all of which are made of extruded light metal such as aluminum alloy.

The front member 14F includes a hollow, cylindrical structure made of extruded light metal, and the rear member 14R has a hollow, rectangular, closed cross-sectional structure made of extruded metal. A front distal end of the rear member 14R is joined to a rear end of the joint member 26, a front end of which receives a rear end of the front member 14F, with junctions being welded together in a unitary structure.

With such a structure wherein the rear end of the front member 14F is inserted at the rear end into the joint member 26, the joint portion has a multi-layered wall structure and, owing to an engine mount 27 fixed to the joint member 26, the joint member 26 has the highest rigidity in the longitudinal rigidity pattern Sy wherein the front member 14F has the low rigidity due to its small cross-sectional area and the rear member 14R has an increased, closed cross-sectional structure to provide a rigidity smaller than that of the joint member 26 in the longitudinal rigidity pattern Sy.

The front member 14F has a substantially front half segment Fa and a substantially rear half segment Fb, and the rear member 14R has a substantially front half segment Ra and a substantially rear half segment Rb having an increased, closed cross-sectional area, with an intermediate section 13M being provided at the joint member 26 such that the front half segment Fa and the rear half segment Fb of the front member 14F, the intermediate joint section 26, and the front half segment Ra and the rear half segment Rb of the rear member 14R have the same different rigidities in the longitudinal rigidity pattern Sy as in the first preferred embodiment.

Also, the rear member 14R has the same widthwise rigidity adjustment section 21 as that in the first to third preferred embodiment such that the rear member 14R has an inward weakened portion having a lower rigidity than that of the outside structure in the widthwise rigidity pattern Sx.

With such a structure in the fourth preferred embodiment, when the front side frame member 14 is subjected to an impact in the longitudinal direction of the body structure in a frontal impact, owing to a particular structure in the front side frame member 14 wherein the longitudinal rigidity pattern Sy is formed by three zones 14F, 26 and 14R having the different rigidities, namely, the low rigidity zone, the highest rigidity zone and the high rigidity zone, the rear member 14R coupled to the cabin C provides a desired supporting rigidity to the front side frame member 14. Since, also, the longitudinal collapsing force to be applied to the front member 14F is reliably supported by the intermediate joint member 26 having the highest rigidity, it is possible to increase the magnitude of the collapsing reacting force encountered in early stage of the frontal impact, allowing the front member 14F to collapse and deform in good order from its front distal end.

When the collapsing force further increases during a collision, since the front distal ends of the front side frame members 14 are restricted for widthwise, outward expanding movement due to the bumper armature 15, a first cross member (not shown) and a radiator core support panel (not shown) while the rear section 14R has a reduced widthwise, inward rigidity characteristic, the rear section 14R of each front side frame member 14 is inwardly bent to deform in the widthwise direction around the center formed by the rear section 14R. When this occurs, stress is concentrated to discontinuous rigidity boundaries formed in the front section 14F, the intermediate joint section 26 and the rear section 14R, allowing each of the front side frame members 14 to bent and deform inwardly in the widthwise direction, to provide multi-stage folded segments for thereby effectively absorbing the impact energy in the frontal impact.

In such an inward bending and deforming operation of the front side frame members 14 in the widthwise direction of the body structure, each front side frame member 14 has an increased deforming stroke in the longitudinal direction of the body structure BS, with a resultant increase in an collapsible area in the front compartment F.C such that the front compartment F.C is allowed to deform in a desired state to achieve an efficient impact absorption while effectively increasing the amount of impact energy to be absorbed by each front side frame member 14.

Since, further, each of the front side frame members 14 is allowed to deform inwardly in the widthwise direction without causing any irregular bending or deformation and each front section 14F is caused to collapse and deform in good order initially from the front half segment Fa of the front section 14F having the low rigidity characteristic, the front compartment F.C is allowed to deform in a desired, stable deforming mode at both the right and left side portions, improving the impact energy absorbing characteristic in the frontal impact.

In addition to the effectively improved energy absorbing characteristic of the front side frame members 14, the front side frame members 14 are allowed to deform inwardly in the widthwise direction of the body structure such that the front side frame members 14 have an increased deforming stroke in the longitudinal direction of the body structure to allow each intermediate section 14M having the highest rigidity to be folded inwardly in the widthwise direction around the rear section 14R having the intermediate rigidity. Thus, the intermediate section 14M and the rear section 14R can avoid formation of a prop portion of a rigid structure that would otherwise transmit an impact load to the cabin C, thereby decreasing a decelerating speed of the cabin.

In each of the above preferred first to fourth embodiments, when the longitudinally extending side frame members, which are typically represented by the hood ridge frame members or front side members, are subjected to impact load in the longitudinal direction of the body structure in a frontal impact, the side frame members are caused to collapse and deform in plural stages in the longitudinal direction, resulting in an increase in the reacting force to allow the side frame members to inwardly bend in the widthwise direction. By allowing the side frame members to collapse in the longitudinal direction and to bend inwardly in the widthwise direction, the body structure enables to provide a smooth, continuous and progressive energy absorbing characteristic for thereby mitigating the transmission of the heavy impact load the cabin in an effective manner.

Owing to inward bending operation of the side frame members in the widthwise direction of the body structure, the bending and deforming stroke of the side frame members is effectively extended in the longitudinal direction of the body structure, with a resultant increase in the collapsible region of the side frame members. This causes the compartment to collapse in a desired deforming pattern, thereby effectively absorbing the impact energy while effectively increasing the amount of energy to be absorbed.

The body structure as mentioned above prevents the side frame members from deforming in undesired, irregular patterns to ensure the side frame members to bend inwardly in the widthwise direction in a desired, regular pattern, resulting in a stabilized deforming modes at both sides of the body structure to provide an improved energy absorbing characteristic.

Owing to the increased deforming stroke of the side frame members in the longitudinal direction of the body structure due to inward bending operation of the side frame members in the widthwise direction, it is possible for the side frame members to avoid the impact load to be transferred to the cabin due to formation of props that would be caused by non-collapsing parts remained in the side frame members in the frontal impact, with a resultant decrease in the deceleration speed of the cabin.

Due to provision of the side frame members each including plural collapsible zones having different longitudinal rigidity characteristics, it is possible for the side frame members to collapse and deform in plural stages in positive ways, thereby providing a stabilized deforming mode in the side frame members in the frontal impact.

More specifically, due to provision of the side frame member shaving three deforming zones, namely, a soft rigidity zone, a strong rigidity zone and a normal rigidity zone which are sequentially located from front ends of the side frame members toward the cabin while the normal rigidity zone is directly coupled to the side of the cabin to ensure a rigidity support for the longitudinal side frame members and the strong rigidity zone is arranged to provide a rigidity support to resist axial collapsing force of the soft rigidity zone, it is possible for the side frame members to increase the reacting force rising in an early stage of the frontal impact while enabling the soft rigidity zone to collapse and deform in a regular pattern, resulting in an increase in the amount of energy to be absorbed by the side frame members.

Due to provision of the strong rigidity zone at each central part of the side frame members and the soft and normal rigidity zones provided in fore and aft areas of the strong rigidity zone to provide discontinuous rigidity points formed at boundaries between adjacent rigidity zones for thereby allowing stress to be concentrated to the discontinuous rigidity points, the side frame members are allowed to bend and deform in folded states in multi-stages, thereby enabling the side frame members to bend and deform inwardly in the widthwise direction in a regular deforming pattern.

Owing to the structure provided at an inside wall of the normal rigidity zone of each side frame member such that the inside wall has a lower rigidity than an outside wall of the normal rigidity zone in the widthwise direction of the body structure, each side frame member is caused to bend inwardly in the widthwise direction about the center provided by the normal rigidity zone, causing the strong rigidity zone to be folded inward in the widthwise direction. Thus, it is possible for the side frame members to avoid the impact load to be transferred to the cabin due to formation of props that would be caused by non-collapsing parts remained in the side frame members in the frontal impact, with a resultant decrease in the deceleration speed of the cabin.

In addition, owing to a pair of side frame members that obliquely and downwardly extend at upper sides of the compartment and that are designed to collapse and deform in the forward longitudinal direction of the body structure in a first stage and further to bend inwardly in the widthwise direction in a second stage, thereby effectively absorbing the impact energy in the frontal impact while effectively preventing the formation of non-collapsed rigid structure, remaining in the side frame members, that would transfer the impact load to the cabin, with a resultant decrease in the deceleration speed of the cabin.

Figure 13:
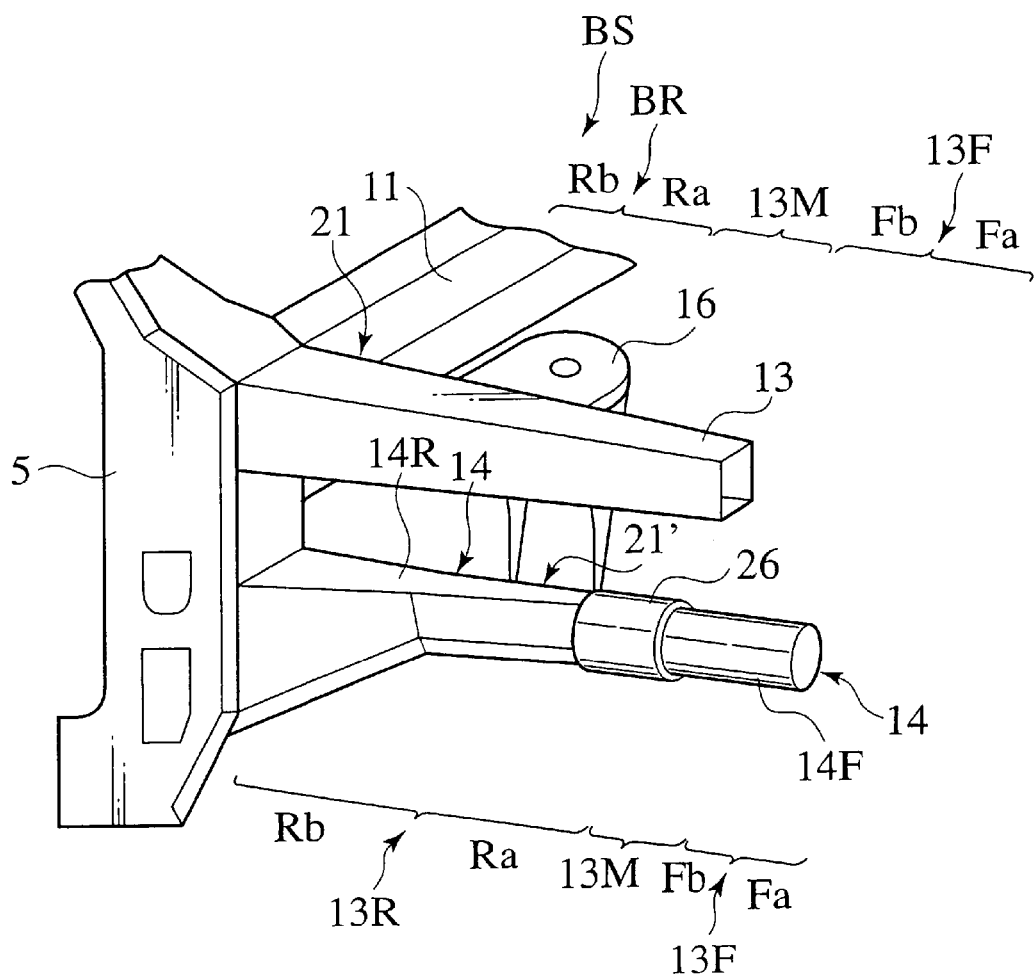
FIG. 13 is an enlarged, partial perspective view of a fifth preferred embodiment of a body structure according to the present invention.

Next, FIG. 13 shows an enlarged, perspective view of a fifth preferred embodiment of a body structure according to the present invention, with like parts bearing the same reference numerals and symbols as those used in FIG. 12.

In the modified form of the fifth preferred embodiment shown in FIG. 13, the body structure BS includes hood ridge frame members 13 of the same structures as those of the first preferred embodiment, and front side frame members 14 of the same structures of the fourth preferred embodiment.

More specifically, each of the hood ridge frame member 13 has three different rigidity sections 13F, 13M and 13R having the low rigidity, the highest rigidity and the high rigidity, respectively, in the longitudinal rigidity pattern Sy, with the rear section 13R including a widthwise rigidity adjustment section 21 shown in FIG. 2 to allow inward bending or deforming of the rear section 13R in the widthwise direction.

Likewise, each of the front side frame members 14 has three different rigidity sections 14F, 26 and 14R having the low rigidity, the highest rigidity and the high rigidity, respectively, in the longitudinal rigidity characteristic, with the rear section 14R including a widthwise rigidity adjustment section 21' to allow inward bending or deforming of the rear section 14R in the widthwise direction.

In addition to the above features, a strut housing 16 is joined to both the intermediate section 13M of each hood ridge side frame member 13 and each front side frame member 14 by welding and functions as a synchronous connecting member, allowing the hood ridge side frame member 13 and the front side frame member 14 to deform in the longitudinal direction in a synchronous manner in he frontal impact.

With such a structure arranged in the modified form of FIG. 13, since the front side frame members 14 project forwardly of the hood ridge side frame members 13, the front side frame members 14 are subjected to an impact force in the longitudinal direction in the frontal impact and the intermediate section 14F are allowed to collapse prior to collapsing and deforming of the hood ridge side frame members 13. However, the impact force applied to the front side frame members 14 are transmitted to and dissipated by the hood ridge side frame members 13 by means of the strut housings 16, with a resultant increase in the reactive collapsing force of the front side frame members 14.

When the intermediate joint section 26 of the front side frame members 14 are subjected to a further continuous impact force and deform to a point wherein the hood ridge side frame members 13 begins to be directly subjected to the impact force in the longitudinal direction, the intermediate sections 13M of the hood ridge side frame members 13 are caused to deform in the longitudinal direction, allowing the intermediate sections of both the front side frame members 14 and the hood ridge frame members 13 to deform in good order in a synchronous fashion to provide an increased energy absorbing characteristic.

When either one of the front side frame member 14 or the hood ridge side frame member 13 begins to inwardly bent and deformed in the widthwise direction around the center in close proximity to the widthwise rigidity adjustment section, the rotational moment produced in one of the hood ridge side frame member 13 and the front side frame member 14 causes the other member to synchronously bend and deform inward in the widthwise direction by means of the strut housing 16.

Owing to the collapsing and deforming operations in the longitudinal direction and inward bending and deforming operations in the widthwise direction of the hood ridge frame members 13 and the front side frame members 14, it is possible to effectively increase the amount of an impact energy to be absorbed by the front compartment F.C. Further, the hood ridge frame members 13 and the front side frame members 14 are caused to bend inward in the widthwise direction in a synchronous fashion, thereby stabilizing the deforming mode of the front compartment for thereby improving the energy absorbing characteristic.

In the fifth preferred embodiment, owing to the hood ridge frame members and the front side frame members that longitudinally extend at upper and lower sides of the compartment and that are designed to collapse and deform in the longitudinal direction of the body structure in a first stage and further to bend inwardly in the widthwise direction in a second stage, it is possible to effectively absorb the impact energy in the frontal impact while effectively preventing the formation of non-collapsed rigid structures both in the hood ridge frame members and the front side frame members that would transfer the impact load to the cabin, with a resultant decrease in the deceleration speed of the cabin.

Next, a sixth preferred embodiment of a body structure according to the present invention will be described with reference to FIGS. 14 to 22, with like parts bearing the same reference numerals as those used in FIGS. 1 to 13.

Figure 14:
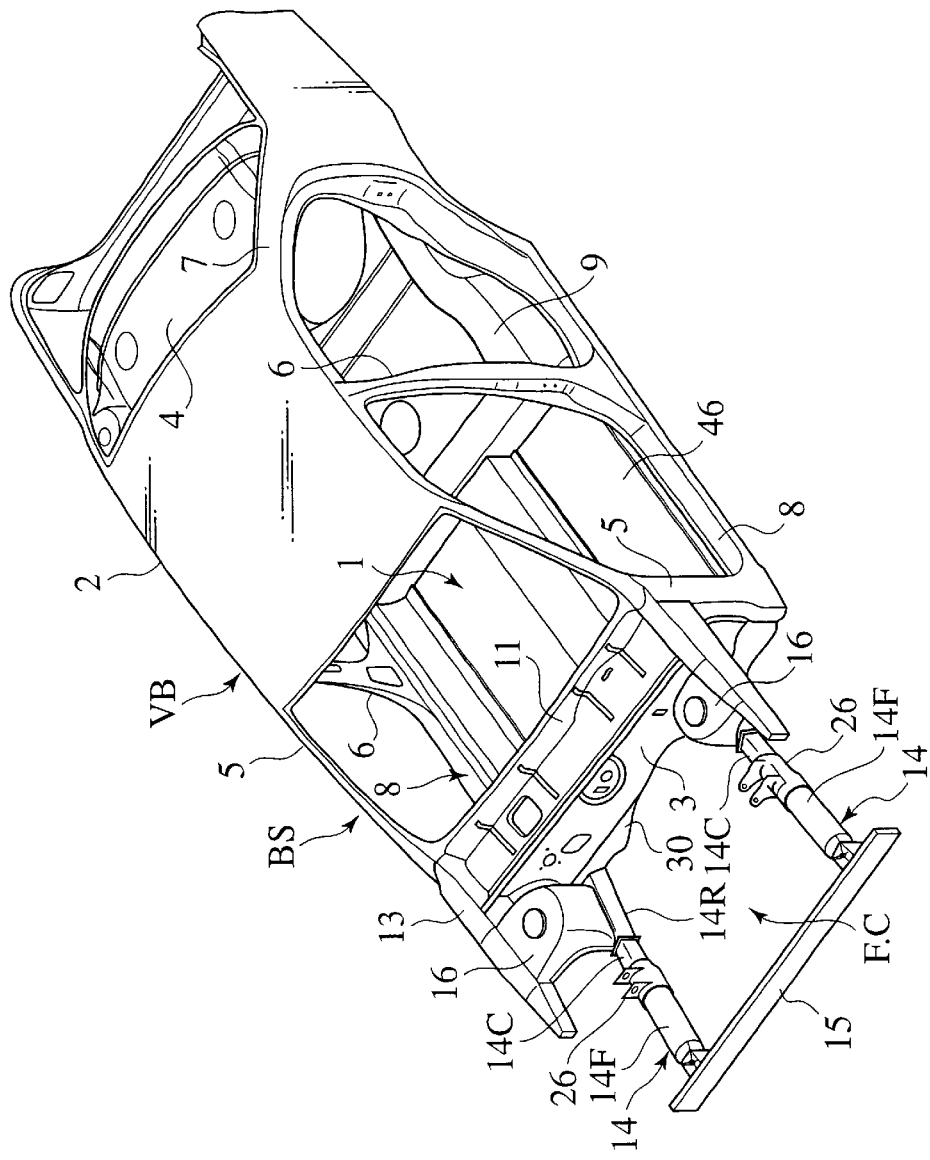
FIG. 14 is a perspective view of a sixth preferred embodiment of a body structure according to the present invention, with the body structure being shown as applied to a motor vehicle.

In FIG. 14, the body structure BS includes a pair of laterally spaced longitudinally extending front side frame members 14 that projects at both lower sides of a front compartment F.C of a vehicle body VB. Since both of the front side frame members 14 are identical in structure and symmetrical to one another, one of the front side frame members 14 will be described in detail hereinafter.

More specifically, the front side frame member 14 includes a front member 14F, a joint member 26, a central member 14C and a rear member 14R.

The front member 14F is made of a hollow, cylindrical extruded metal such as aluminum alloy or magnesium alloy, forming an energy absorbing member. The joint member 26 is joined to the front member 14F and the central member 14C. The rear member 14R is also made of extruded metal and connected to the central member 14C and a dash lower panel 30 that forwardly extends from a dash cross member 3.

Figure 15:
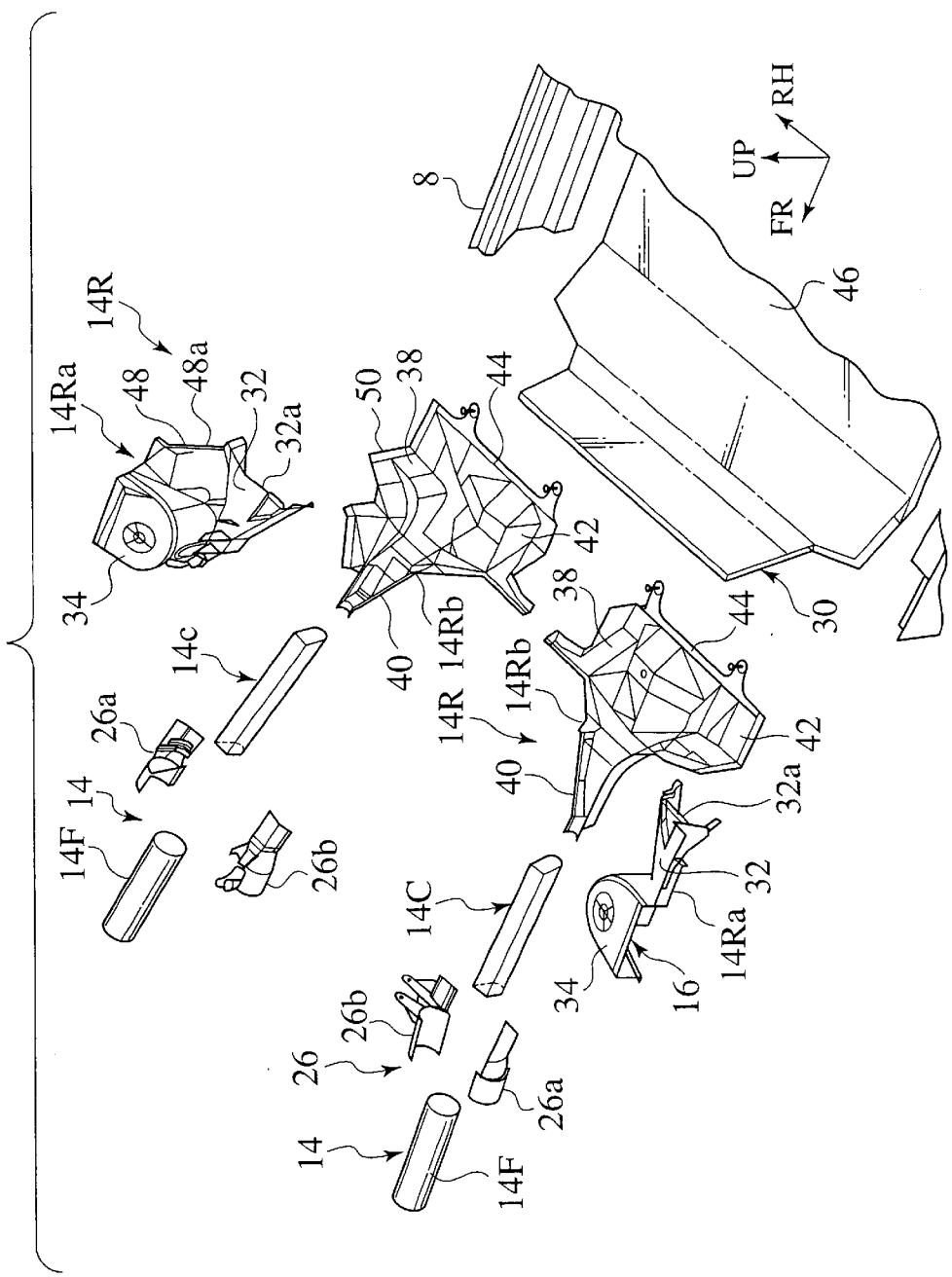
FIG. 15 is an exploded, perspective view of the body structure shown in FIG. 14.
Figure 16:
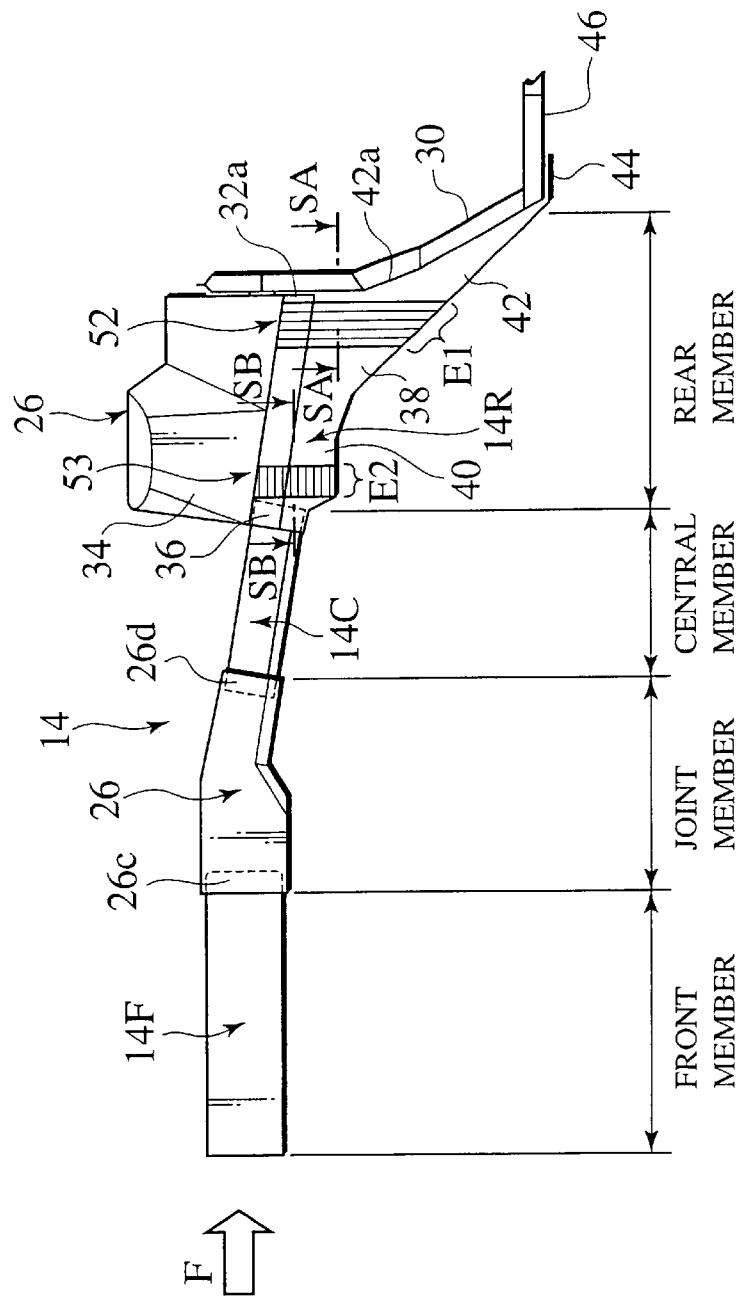
FIG. 16 is an enlarged side view of the body structure shown in FIG. 14.

As best shown in FIG. 15, the joint member 26 includes a pair of half members 26a and 26b both of which are made of aluminum or magnesium die-cast. As shown in FIG. 16, the joint member 26 receives a rear end of the front member 14F in a front overlapping region 26c and also receives a front end of the central member 14C in a rear overlapping region 26d. The half members 26a and 26b are mated with one another by welding, and the rear end of the front member 14F and the front end of the central member 14C are joined to the joint member 26 by welding in one-piece.

The rear member 14R includes an upper half segment 14Ra and a lower half segment 14Rb, both of which are made of aluminum or magnesium die-cast, with the upper and lower half segments 14Ra and 14Rb being mated with one another to form a hollow, closed cross-sectional structure. The upper half segment 14Ra has a lateral wall 32 and an upright strut tower segment 34, forming a strut housing 16, that extends upward from the lateral wall 32. The lower half segment 14Rb includes a central body 38, a longitudinally extending front segment 40 that projects forward from the body 38, an obliquely and downwardly extending rear segment 42 having a lower distal end 44 longitudinally extending below a floor panel 46 and secured thereto by welding. The upper and lower half segments 14Ra and 14Rb are mated with one another by welding such that a rear end of the central member 14C is sandwiched between the upper and lower half segments 14Ra and 14Rb in an overlapping region 36, with three components being connected together in one-piece by welding.

A substantially vertical rear end 32a of the upper half segment 14Ra and an oblique rear end 42a of the lower half segment 14Rb are placed in abutting engagement with the dash lower panel 30 and connected thereto by welding. The lower segment 42 has a lower rear end 44 laterally extending rearward below the floor panel 46 and connected thereto by welding. Also, vertically extending outward side walls 48 and 50 of the upper and lower half segments 14Ra and 14Rb, respectively, are connected to the side sill 8 by welding. All the structural components including the dash lower panel 30, the floor panel 46 and the side sills 8 serve as a cabin component parts.

Figure 17:
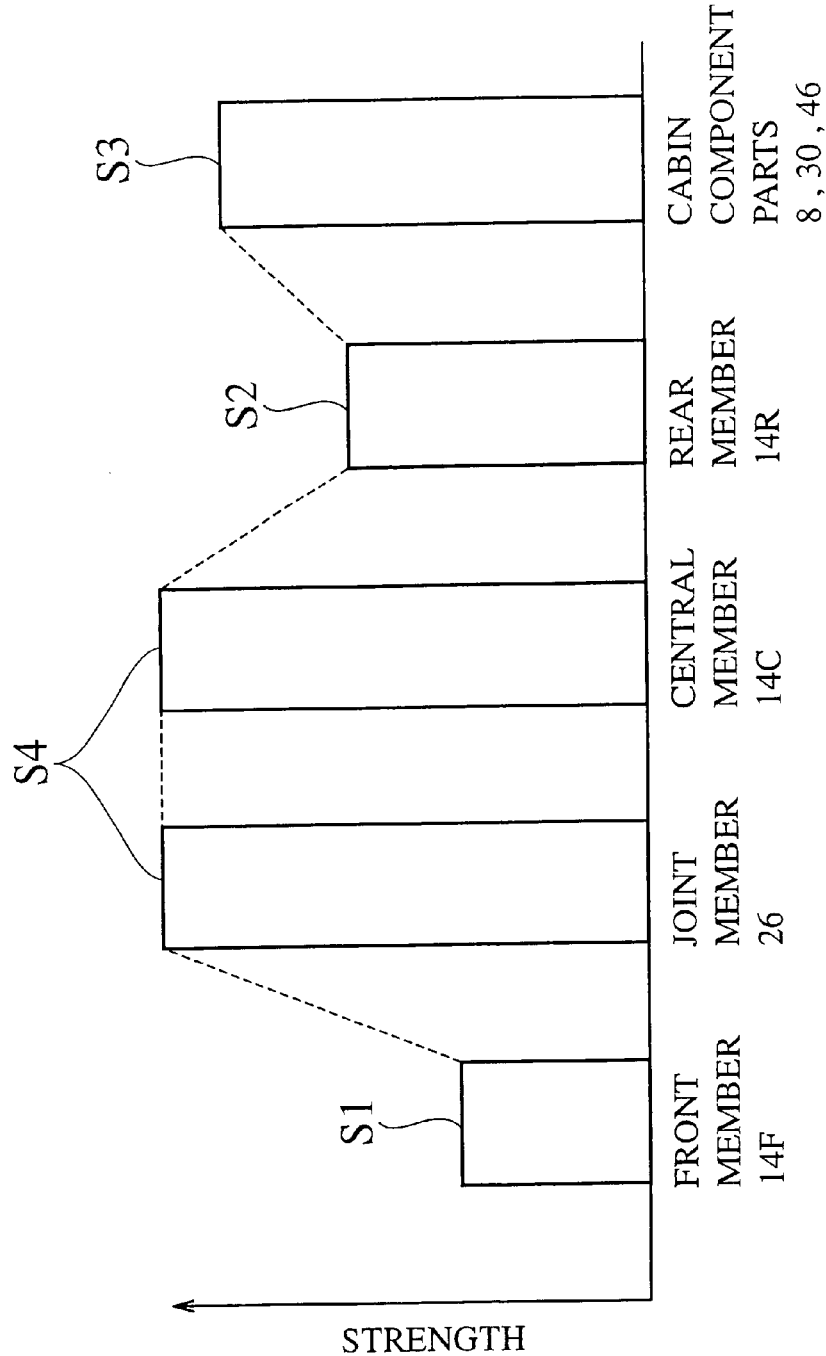
FIG. 17 is a view for illustrating the relationship between the strength and the various sections of the side frame member of the body structure shown in FIG. 14.

FIG. 17 shows the relationship between the strength and various component parts of the body structure BS. As shown in FIG. 17, the front member 14F has a first (low) strength S1, and the rear member 14R has a second (high) strength S2. The cabin component parts 8, 30 and 46 have a third (higher) strength S3, and the central member 14C and the joint member 26 have a fourth (highest) strength S4, respectively. Thus, the central member 14C and the joint member 26 have the highest rigidity, and the cabin component parts 8, 30 and 46 have a rigidity higher than that of the rear member 14R. The front member 14F is designed to have the low rigidity. In other words, the front member 14F has the rigidity lower than that of the rear member 14R. Namely, the rear member 14R has a larger collapsing strength than that of the front member 14F.

Figure 18:
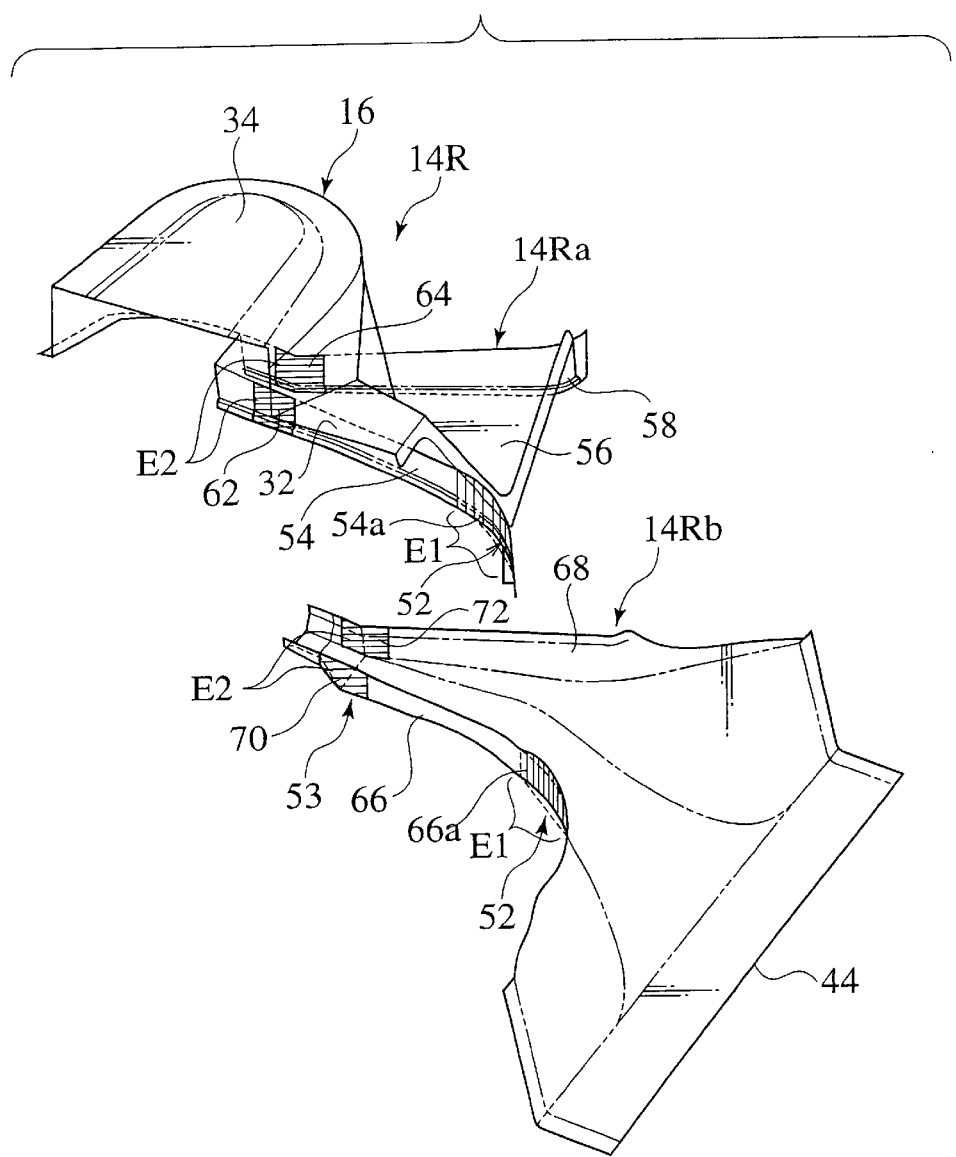
FIG. 18 is an enlarged, exploded perspective view of a rear member of the body structure shown in FIG. 14.
Figure 19:
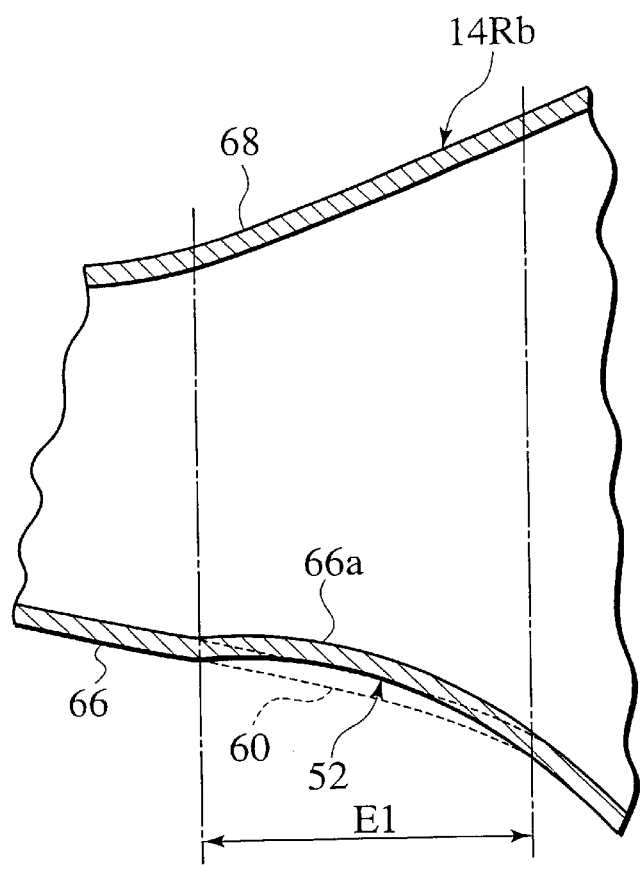
FIG. 19 is a partial cross sectional view taken along lines SA—SA shown in FIG. 16.

As clearly shown in FIGS. 18 and 19, the rear member 14R includes a widthwise rigidity adjustment section composed of a bending promotive section 52, and a bending assist portion 53. The bending promotive section 52 and the bending assist portion 53 facilitate bending and deforming motions at an energy absorbing region E1 and a weakened or crushable region E2, respectively, of the rear member 14R in a frontal impact applied from the front member 14F. To this end, the rear member 14R has a non-symmetrical strength distribution pattern in the widthwise direction. More specifically, the strut tower segment 34 is integral with the lateral wall 32, which is connected through a vertical wall 54 with a lower lateral wall 56 that has a downwardly extending vertical wall 58.

More specifically, the vertical wall 54 of the upper half segment 14Ra has the region E1 formed with a curved portion 54a that is indent inward from a gradually extending slope of the vertical wall 54 to provide a thin wall section that provides a lowered rigidity. Also, the upper half segment 14Ra has a pair of thin wall portions 62 and 64 at the weakened regions E2 in close proximity to the strut tower segment 34 to provide lower rigidities.

Likewise, the lower half segment 14Rb has bifurcated vertical walls 66 and 68, with the vertical wall 66 having the region E1 formed with a curved portion 66a that is indented inwardly from a gradually extending slope 60 shown in FIG. 19, like the curved portion 54a of the upper half segment 14Ra.

As best seen in FIG. 18, the curved portions 54a and 66a are formed at positions close to the junction between the front side frame member 14 and the dash lower panel 30 to provide a lowered rigidity, thereby forming the bending promotive portion 52 of the rear member 14R.

Figure 20:
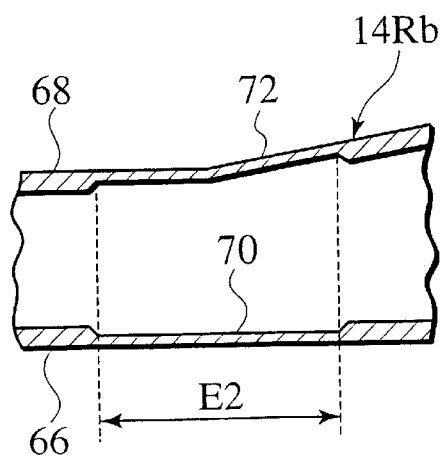
FIG. 20 is a partial cross sectional view taken along line SB—SB shown in FIG. 16.

As best seen in FIGS. 19 and 20, further, a front end of the lower half segment 14Rb has at the weakened regions E2 that is vertically aligned with the weakened regions E2 of the upper half segment 14Ra and has first and second thin wall portions 70 and 72, thereby forming the bending assist portion 53 of the rear member 14R.

As shown in FIG. 18, the vertical walls 58 and 68 of the upper and lower half segments 14Ra and 14Rb, respectively, have no inwardly indented curved portions or weakened portions and the rear member 14R has the outer wall section and the inner wall section, which provide non-symmetric rigidity in the strength distribution pattern in the widthwise direction with respect to an impact load applied in the longitudinal direction of the body structure BS from the front member 14F of the front side frame member 14. Due to the bending promotive portion 52 defined by the inwardly indent curved portions 54a and 66a of the upper and lower half segments 14Ra and 14Rb, respectively, the neutral axis L of the front side frame member 14 is offset from a center line CL of the front side frame member 14, thereby forming the energy absorbing section E1 to which the bending moment acts in the frontal impact.

Similarly, the bending assist portion 53 of the front side frame member 14 functions to facilitate the rear member 14R to bend and deform substantially coaxially with the axis in which the rear part of the rear member 14R to bend owing to its weakened or crushable region E2.

Note should be undertaken that the energy absorbing region E1 and the weakened region E2 of the rear member 14R are designed to have the same strength as indicated in FIG. 17, namely, to be larger than that of the front member 14F.

Figure 21A:
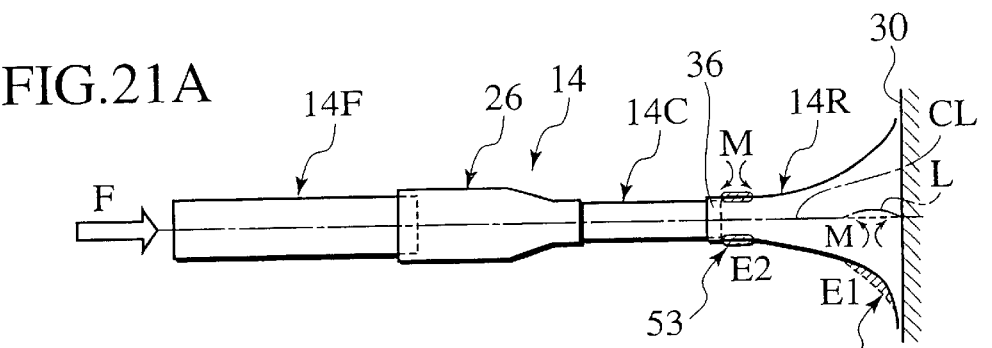
Figure 21B:
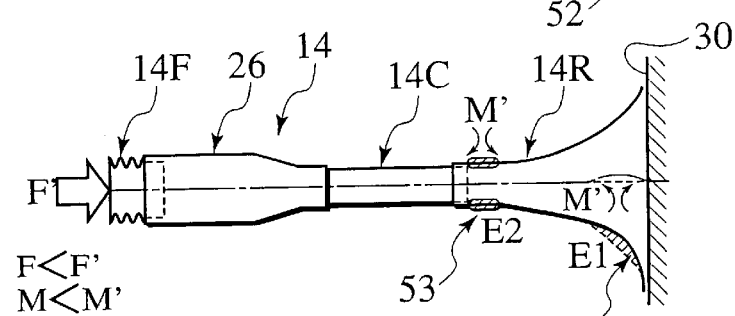
Figure 21C:
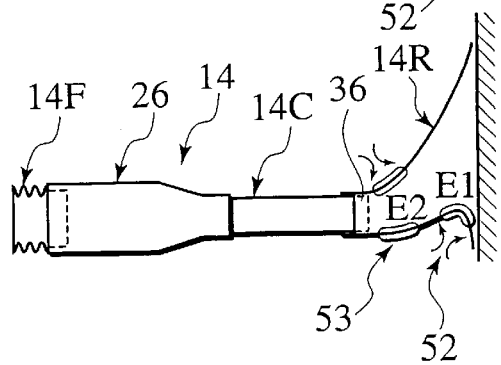
Figure 22:
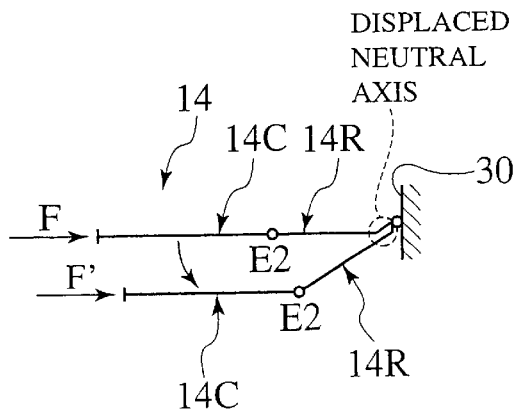
FIG. 22 is a schematic view for illustrating the bending operation principle of the front side frame member shown in FIG. 14.

In operation with such a structure, when the front side frame member 14 is subjected to an impact force F from a forward portion of the body structure BS in a frontal impact, the front member 14F is caused first to collapse in an axial direction (the longitudinal direction of the body structure) from an original state of FIG. 21A to an early stage in a collapsed state of FIG. 21B. During collapsing of the front member 14F in the axial direction, the impact force acting on the front member 14F further increases from F to F' and, accordingly, the bending moment increases from M shown in FIG. 21A to M' shown in FIG. 21B. At the same time, owing to the weakened region E2 of the bending assist portion 53, the bending moment increases from M to M', facilitating the front end of the rear member 14R to bend in the axial direction. This causes the rear member 14R to bend into a crank-shape in the widthwise direction about a vertical axis crossing the upper and lower portions of the body structure as viewed in FIGS. 21C and 22.

Consequently, when the impact load is relatively low, the impact energy is absorbed only by the front member 14F that is collapsed and deformed and, when the impact load further increases, the rear member 14R is caused to bend and deform into the aforementioned crank-shape, thereby allowing the front side frame member 14 as a whole to absorb a great deal of energy in the frontal impact. With such a bending and deforming operations of the rear member 14R, the rear member 14R is not subjected to an increased local strain or distortion as would be caused in the collapsing of the front member 14F, thereby allowing the rear member 14R to have the entire cross sectional area to resist stress such that the impact energy is effectively absorbed even when the rear member 14R is made of metal die-cast having a lower extensibility than a press formed product.

Since, further, the rear member 14R has the energy absorbing region E1 and the weakened region E2 at the rear and front ends thereof, respectively, a deforming stroke is provided in an effectively extended range in the longitudinal direction of the body structure, with a resultant effective increase in the energy absorbing characteristic in the frontal impact.

In the sixth preferred embodiment, due to provision of the front side frame members extending in the longitudinal direction of the body structure and each including a front member formed of extruded light metal and serving as an energy absorbing section, an intermediate or central member made of extruded light metal and coupled to rear end of the front section by means of a joint member, and a rear member made of metal die-cast and connected at a front end with the rear end of the central member in an overlapping state and also connected at a rear end to frame components parts of the cabin wherein the front member has a lower strength than the rear member and the rear member is arranged to have a bending promotive portion having a non-symmetric strength distribution pattern in the widthwise direction of the body structure to promote the rear member to bend and deform responsive to impact load applied to the rear member from the front member, it is possible for the front side frame members to collapse and deform at the front members in a first energy absorbing stage and subsequently to cause the rear member to deform in the widthwise direction owing to the bending promotive portion in a second energy absorbing stage prior to deforming operation of the cabin, with a resultant increase in the energy absorbing capabilities. In particular, the bending promotive portion provides the non-symmetric strength distribution pattern in the closed cross-sectional structure of the rear member in the widthwise direction, facilitating bending operation of the rear member inward in the widthwise direction. Thus, it is possible to avoid an increased localized distortion that would otherwise be caused in the longitudinal collapsing mode and to ensure a desired bending and deforming mode, permitting the use of the rear member made of metal alloy die-cast having a lower toughness than the press-formed products while providing a stabilized energy absorbing characteristic.

The bending promotive portion is provided at a rear end of the rear member in close proximity to the junction between the rear member and the cabin component parts, and the bending assist portion is provided at the front end of the rear member in close proximity to the junction between the central member and the rear member. With such a structure, the rear member of the front side frame member can be deformed in a stroke to form folded crank-shape profiles at the front and rear ends of the rear member, ensuring an extended collapsing stroke in the longitudinal direction to provide an improved energy absorbing characteristic.

Since the bending promotive portion includes a weakened section formed in part of the rear member in the widthwise direction of the body structure, the neutral axis of the rear member is caused to be displaced to allow the bending portion to produce the bending moment responsive to the impact load applied to the front side frame member in the frontal impact, providing an energy absorbing structure that facilitates bending operation of the rear member starting from the weakened section, in an easy manner.

The weakened section of the bending promotive portion can be formed with a gradually sloping curved region which is inwardly indented in the closed cross-sectional structure of the rear member in the widthwise direction. Consequently, it is possible to prevent the rear section of the front side frame member from being deformed into a substantially, excessively collapsed state in a localized area, thereby allowing the front side frame member to be deformed in a wide range at the rear member to ensure an effectively improved energy absorbing characteristic.

The bending assist portion of the front side frame member functions to facilitate the rear member to bend and deform substantially coaxially with the axis in which the rear part of the rear member to bend owing to the bending promotive portion.

The weakened section of the bending assist portion can have a thin wall portion a thickness of which decreases in the widthwise direction.

Next, a seventh preferred embodiment of a body structure according to the present invention will be described with reference to FIGS. 23 to 26.

Figure 23:
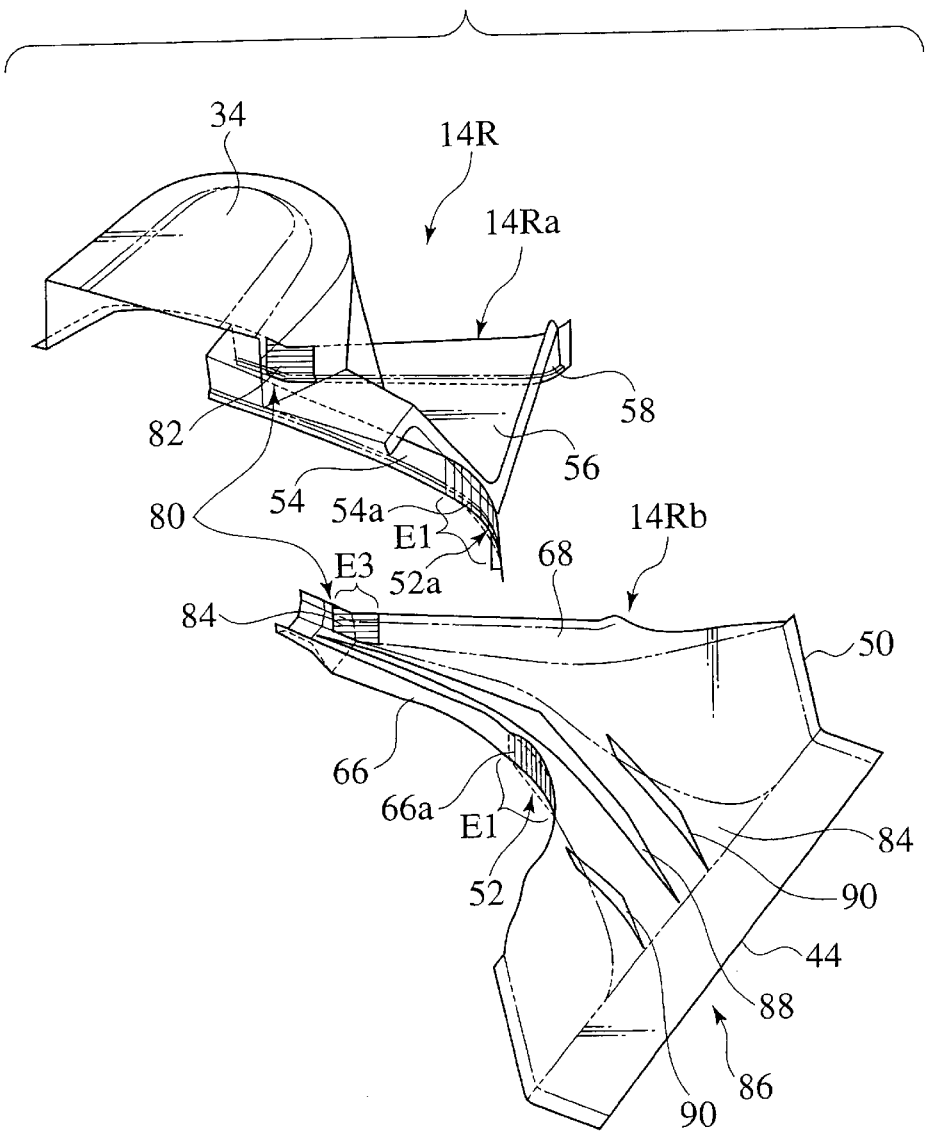
FIG. 23 is an enlarged, exploded perspective view of a seventh preferred embodiment of a body structure according to the present invention.
Figure 24:
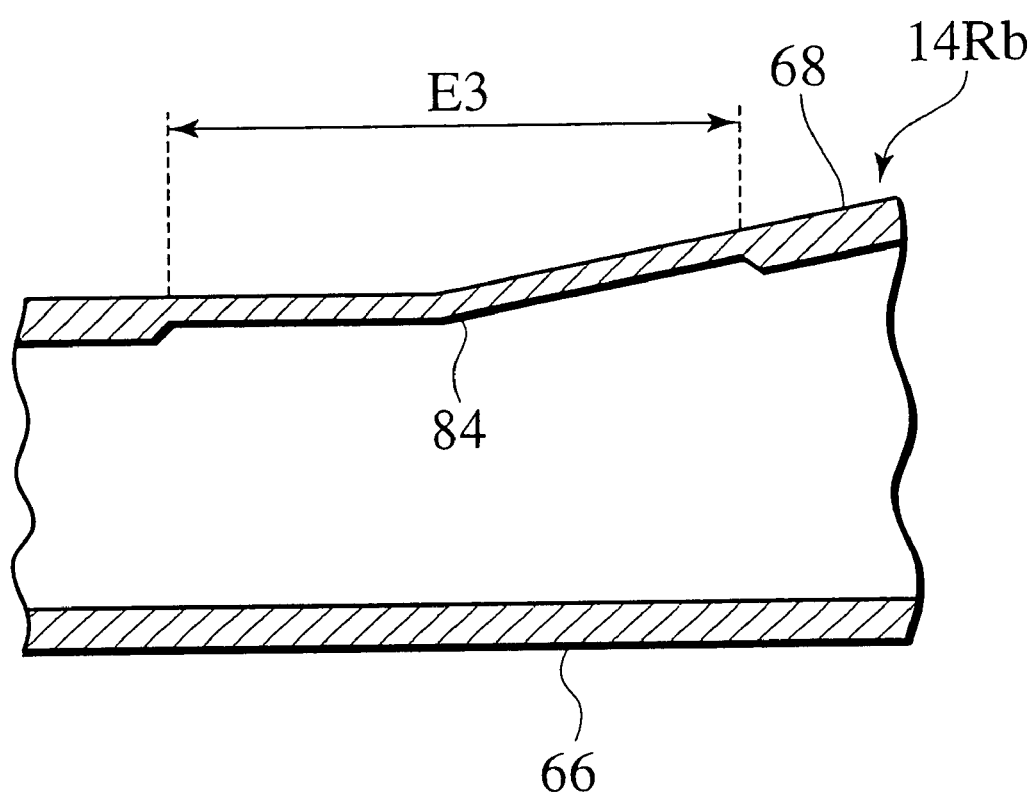
FIG. 24 is an enlarged cross sectional view of a front end of a lower half segment of the rear member shown in FIG. 23.

The seventh preferred embodiment relates to a modified form of the rear member 14R shown in FIGS. 14 to 22, wherein FIG. 23 is a perspective view of the modified form of the rear member, FIG. 24 is a cross sectional view of the rear member at the same position as that shown in FIG. 20, and FIGS. 25A to 25C and FIG. 26 are views for illustrating a basic sequence of operation of the rear member, with like parts bearing the same reference numerals and symbols as those used in FIGS. 14 to 22.

In the modified form shown in FIGS. 23 and 24, the bending assist portion 53 of the rear member 14R is replaced with a bending promotive portion 80. As already discussed above with reference to the fifth preferred embodiment, the bending promotive portion 52 is formed in the rear end portion of he rear member 14R in close proximity to the junction between the front side frame member 14 and the dash lower panel 30, and the bending promotive portion 80 is formed in the rear member 14R in close proximity to the junction between the rear member 14R and the central member 14C. Namely, the rear member 14R has plural bending promotive portions 52 and 80 spaced from one another in the longitudinal direction such that the rear member 14R is subjected to bending moments in opposing directions.

More specifically, the bending portion 80 has a varying thin wall distribution pattern. Namely, the bending promotive portion 80 includes a thin wall portion 82 formed at a front end of the vertical wall 58 of the upper half segment 14Ra, and a thin wall portion 84 of the lower half segment 14Rb. As shown in FIG. 24, the thin wall portion 84 is formed in an energy absorbing region E3 defined at a front end of the vertical wall 68 of the lower half segment 14Rb as shown in FIG. 24. That is, the thin wall portion 84 has a lower thickness than the vertical wall 66 such that the bending promotive portion 80 has the strength distribution pattern which is non-symmetric in the widthwise direction to provide different rigidities at the vertical walls 66 and 68 to allow the neutral axis of the rear member 14R to be displaced in the widthwise direction.

With such a structure, when the front member 14F of the front side frame member 14 is subjected to the frontal impact, the energy absorbing region E3 causes the rear member 14R to be subjected to a bending moment opposite to that caused by the rear energy absorbing region E1. It is to be noted that the rear member 14R having the energy absorbing regions E1 and E3 is designed to have a higher strength than that of the front member 14F as in the preferred embodiments discussed above.

In the modification of FIG. 23, the lower half segment 14Rb of the rear member 14R also has a bottom wall 84 formed with an additional energy absorbing portion 86 that includes a plurality of laterally spaced, longitudinally extending upright central rib 88 and side ribs 90. With this structure, the bottom wall 84 has a larger strength than that of the lateral wall 56 of the upper half segment 14Ra such that the closed cross-sectional structure of the rear member 14R has a varying strength distribution pattern to provide the bending promotive portion 86 having a non-symmetric rigidity pattern. Also, it is to be noted that the central rib 88 is formed in the entire length of the bottom wall 84 of the lower half segment 14Rb.

Accordingly, in the modified form of FIGS. 23 and 24, when the rear member 14R of the front side frame member 14 is subjected to the frontal force acting on the front member 14F, the rear member 14R is caused to bend and deform in the widthwise direction owing to the bending promotive portions 52 and 80, with the same resultant effective energy absorbing effect as obtained in the preferred embodiments discussed above.

Figure 25A:
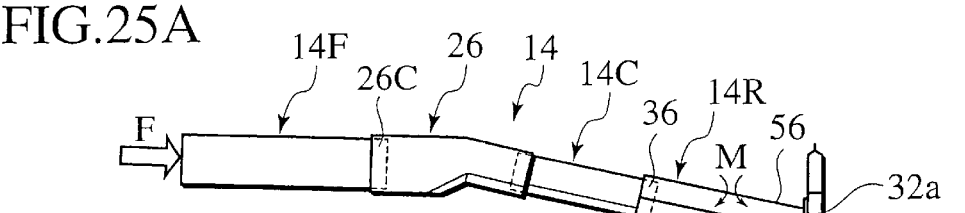
FIGS. 25A to 25C are plan views illustrating the basic operating sequence of the front side frame member in frontal impact shown in FIG. 23.
Figure 25B:
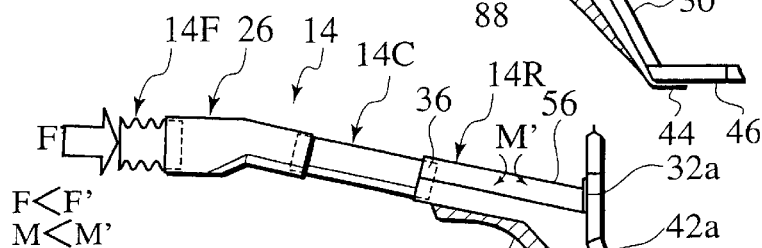
Figure 25C:
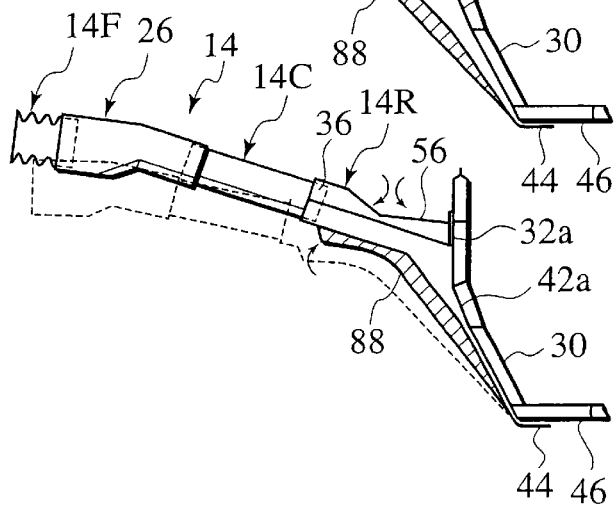
Figure 26:
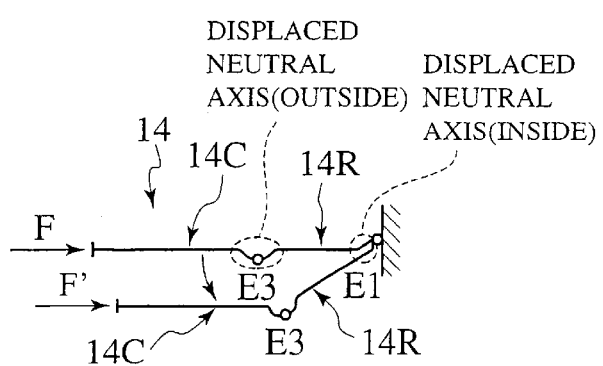
FIG. 26 is a schematic view for illustrating the bending operation principle of the front side frame member shown in FIG. 23.

In the modified form discussed above, when the front side frame member 14 is subjected to a force F due to a frontal impact as shown in FIG. 25A, the front member 14F is caused to collapse, and when the impact load F' further increases as shown in FIG. 25B, the bending moment increases from M shown in FIG. 25A to M' shown in FIG. 25B. In this event, the rear member 14R begins to bend and deform at the lateral wall 56 of the upper half segment 14Ra in an upward direction as viewed in FIG. 25C. Thus, the rear member 14R is enabled to bend upwardly in an extended bending stroke, thereby effectively absorbing impact energy in the frontal impact.

In the seventh preferred embodiment, the rear section of the front side frame member has at its front and rear ends first and second longitudinally spaced, bending promotive portions that cause the front and rear ends of the rear member to bend and deform in opposite directions. That is, the bending promotive portions are provided at a front junction region and a rear junction region of the rear member, respectively, in close proximity to the central member and the cabin component frames, respectively.

Consequently, the collapsing stroke of the front side frame member can be effectively extended in an increased wide range in the longitudinal direction of the body structure to ensure effective utilization of the increased collapsing stroke for absorbing the impact energy.

The plurality of bending promotive portions can be provided on each of upper and lower sides and each of right and left sides of the closed cross-sectional structure of the rear member at its rear ends to cause the bending moments to be produced in opposite directions. Consequently, the front side frame members can be bent in upward or downward or in rightward or leftward, thereby effectively utilizing an increased collapsing stroke to absorb the impact energy in an efficient fashion. Such a bending promotive portion of the rear member can be formed with a plurality of ribs.

The weakened section of each of the bending promotive portions at the front ends of the rear members can be formed by varying the thickness distribution in the rear member, Consequently, this causes the weakened section to be oppositely bent and deformed by the moment produced in the bending promotive portion at the rear end of the rear member, with a resultant increase in the collapsing stroke in the longitudinal direction of the body structure.

The entire contents of a Patent Application No. TOKUGAN 2000-124175 with a filing date of Apr. 25, 2000 in Japan and that of a Patent Application No. TOKUGAN 2000-124184 with a filing date of Apr. 25, 2000 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A body structure of a vehicle, comprising:
   a cabin;
   a compartment in close proximity to the cabin;
   first frame members provided in the compartment, laterally spaced relative to each other in a widthwise direction of the body structure, and longitudinally extending in a longitudinal direction of the body structure from the cabin; and
   a widthwise rigidity adjustment section provided in each of the first frame members and having a non-symmetric strength distribution in the widthwise direction,
   wherein a part of the cabin is formed by second frame members, and each of the first frame members is provided with a front side member that has the widthwise rigidity adjustment section, and the widthwise rigidity adjustment section weakens an inside rigidity of the front side member.

2. A body structure according to claim 1, wherein the widthwise rigidity adjustment section is formed by an inside wall, an outside wall, which is opposed to the inside wall in the widthwise direction of the body structure, an upper wall and a lower wall, which is opposed to the upper wall in a vertical direction of the body structure, and a rigidity of the inside wall is lower than that of the outside wall.

3. A body structure according to claim 2, wherein the front side member further includes a longitudinal rigidity adjustment section having a rigidity changing to be different in the longitudinal direction.

4. A body structure according to claim 3, wherein the longitudinal rigidity adjustment section includes at least three rigidity sections respectively having a first rigidity, a second rigidity and a third rigidity higher than the first rigidity and smaller than the second rigidity, which are sequentially arranged from a forward end of the longitudinal rigidity adjustment section to a rearward end thereof to absorb impact energy in a frontal impact in the longitudinal direction.

5. A body structure according to claim 3, wherein the widthwise rigidity adjustment section is provided in the longitudinal rigidity adjustment section.

6. A body structure according to claim 5, wherein the widthwise rigidity adjustment section is provided in the third rigidity section of the longitudinal rigidity adjustment section.

7. A body structure according to claim 1, wherein the compartment is a front compartment of the body structure, and the front side member includes a hood ridge frame member longitudinally extending at an upper side of the front compartment to be sloped forwardly downward in the body structure.

8. A body structure according to claim 1, wherein the compartment is a front compartment of the body structure, and the front side member includes a front side frame member longitudinally extending at a lower side of the front compartment.

9. A body structure according to claim 1, wherein the compartment is a front compartment of the body structure, the front side member includes a hood ridge frame member longitudinally extending at an upper side of the front compartment to be sloped forwardly downward in the body structure, and the front side member further includes a front side frame member longitudinally extending at an lower side of the front compartment, and wherein a connecting member is provided to interconnect the hood ridge frame member and the front side frame member in a vertical direction of the body structure while allowing the hood ridge frame member and the front side frame member to deform in synchronism to one another in a frontal impact.

10. A body structure according to claim 9, wherein the connecting member includes a strut tower.

11. A body structure according to claim 1, wherein the widthwise rigidity adjustment section includes a rigidity lowering section having an inside portion thereof with a rigidity lower than that of an outside portion thereof in the widthwise direction.

12. A body structure according to claim 11, wherein the rigidity lowering section includes a region having an abruptly varying cross section by changing a thickness, forming a cutout and/or forming a bead.

13. A body structure according to claim 4, wherein the rigidity region having the second rigidity of the longitudinal rigidity adjustment section includes an engine mount supporting section.

14. A body structure according to claim 1, wherein the front side member has a rectangular, closed cross-sectional profile, and the widthwise rigidity adjustment section is formed on an inner wall of the front side member to allow the front side member to deform inward in the widthwise direction in a frontal impact.

15. A body structure according to claim 14, wherein the widthwise rigidity adjustment section formed on the inner wall is formed by a bead, a notch and/or a thin wall.

16. A body structure according to claim 1, wherein the front side member includes a front member made of an extruded material and serving as an impact absorbing section, a central member made of an extruded material and connected to a rear end of the front member through a joint member, and a rear member having a closed cross-sectional profile to be interconnected between a rear end of the central member and the second frame members, a strength of the front member being lower than that of the rear member, and wherein the rear member includes a bending promotive section to facilitate a deformation of the rear member in the widthwise direction in a frontal impact.

17. A body structure according to claim 16, wherein the bending promotive section includes a weakened section weakened in the widthwise direction and formed in part of the rear member.

18. A body structure according to claim 17, wherein the weakened section is formed by varying a thickness distribution in the rear member.

19. A body structure according to claim 17, wherein the weakened section is formed with a gradually sloping curved region which is inwardly indented in the closed cross-sectional profile of the rear member in the widthwise direction.

20. A body structure according to claim 16, wherein the bending promotive section is formed with a plurality of ribs.

21. A body structure according to claim 16, wherein a bending assist portion and the bending promotive section are provided at front and rear ends, respectively, of the rear member so as to be longitudinally spaced from one another and to cause the front and rear ends to bend and deform in opposite directions to one another in the widthwise direction.

22. A body structure according to claim 16, wherein a bending assist section is provided at a front junction section of the rear member in close proximity to the central member and the bending promotive section is provided at a rear junction section of the rear member in close proximity to the second frame members.

23. A body structure according to claim 16, further comprising a bending assist section, wherein the bending promotive section and bending assist section are configured to cause a bending moment to be produced in opposite directions with respect to one another in the widthwise direction and in a direction crossing the opposing directions.

24. A body structure according to claim 16, wherein the bending promotive section is provided at a rear end of the rear member in the close proximity to a junction section between the rear member and at least one of second frame members of the cabin, and an bending assist section having a weakened section is provided to facilitate the rear member to bend substantially coaxially with an axis in which the rear part of the rear member is bent by the bending promotive section.

25. A body structure according to claim 24, wherein the weakened section of the bending assist portion has a thin wall portion a thickness of which decreases in the widthwise direction.

26. A body structure of a vehicle comprising a cabin, side frame members, and a compartment in close proximity to the cabin, wherein each of the side frame members, which are laterally spaced and longitudinally extending in the compartment, has a section that weakens an inside rigidity of each of the side frame members.

27. A body structure of a vehicle, comprising:

a cabin;

a compartment in close proximity to the cabin;

frame members provided in the compartment, laterally spaced relative to each other in a widthwise direction of the body structure, and longitudinally extending in a longitudinal direction of the body structure from the cabin; and means for adjusting a widthwise rigidity in each of the frame members to weaken an inside rigidity of each of the side frame members by a non-symmetric strength distribution thereof in the widthwise direction.

* * * * *